US012693529B2

(12) United States Patent
Jung et al.

(10) Patent No.: US 12,693,529 B2
(45) Date of Patent: Jul. 28, 2026

(54) WEARABLE DEVICE, METHOD, AND NON-TRANSITORY COMPUTER READABLE STORAGE MEDIUM FOR EYE CALIBRATION

(71) Applicant: SAMSUNG ELECTRONICS CO., LTD., Suwon-si (KR)

(72) Inventors: Sunyoung Jung, Suwon-si (KR); Kihwan Kim, Suwon-si (KR); Harksang Kim, Suwon-si (KR); Jinmo Kang, Suwon-si (KR); Beomsu Kim, Suwon-si (KR); Sungoh Kim, Suwon-si (KR); Jihyun Kim, Suwon-si (KR); Sunggeun Ahn, Suwon-si (KR); Donghyun Yeom, Suwon-si (KR); Gunhee Lee, Suwon-si (KR); Sanghun Lee, Suwon-si (KR); Minsheok Choi, Suwon-si (KR); Sungsoo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/083,039

(22) Filed: Mar. 18, 2025

(65) Prior Publication Data

US 2025/0334797 A1      Oct. 30, 2025

Related U.S. Application Data

(63) Continuation of application No. PCT/KR2025/002083, filed on Feb. 12, 2025.

(30) Foreign Application Priority Data

Apr. 26, 2024   (KR) ........................ 10-2024-0056192
Jun. 20, 2024   (KR) ........................ 10-2024-0080674

(51) Int. Cl.
*G02B 27/00* (2006.01)
*G02B 27/01* (2006.01)
*G06T 19/00* (2011.01)

(52) U.S. Cl.
CPC ....... *G02B 27/0093* (2013.01); *G02B 27/017* (2013.01); *G06T 19/006* (2013.01); *G02B 2027/0138* (2013.01)

(58) Field of Classification Search
CPC ............. G02B 27/0093; G02B 27/017; G02B 2027/0138; G02B 27/0172; G06T 19/006
See application file for complete search history.

(56) References Cited

U.S. PATENT DOCUMENTS 6,873,714 B2    3/2005  Witt et al.
8,333,475 B2    12/2012  Sugio et al.
(Continued)

FOREIGN PATENT DOCUMENTS

CN      110320999 A    10/2019
JP      2011-120887 A   6/2011
(Continued)

OTHER PUBLICATIONS

International Search Report (PCT/ISA/210) and Written Opinion (PCT/ISA/237) issued on May 26, 2025 by the International Searching Authority in International Application No. PCT/KR2025/002083.

*Primary Examiner* — Amit Chatly
(74) *Attorney, Agent, or Firm* — Sughrue Mion, PLLC

(57) ABSTRACT

A method executed by a wearable device including a display system including a first display and a second display facing eyes of a user wearing the wearable device, and a plurality of cameras configured to obtain an image including the eyes, includes: displaying objects at different time points on a screen of the display system, based on the image, identifying gazes looking at the objects, identifying, based on the
(Continued)

identified gazes, errors associated with the gazes, wherein the errors indicate differences between display positions of the objects and focal positions of the gazes, and wherein the focal positions have a one-to-one correspondence with the objects, displaying a visual object on a background screen on the display system to move the visual object through partial display positions of the display positions, which are selected based on the errors, and based on another gaze looking at the visual object, correcting the errors.

20 Claims, 17 Drawing Sheets

(56) References Cited

U.S. PATENT DOCUMENTS

| | | | |
|---|---|---|---|
| 9,557,812 B2 | 1/2017 | Maltz | |
| 11,422,622 B2 | 8/2022 | Jeong et al. | |
| 11,468,868 B2 | 10/2022 | Wakabayashi | |
| 11,816,260 B2 | 11/2023 | Krukowski et al. | |
| 2012/0200490 A1* | 8/2012 | Inada | B60R 11/04 |
| | | | 345/156 |
| 2015/0049013 A1 | 2/2015 | Rahman et al. | |
| 2015/0331485 A1 | 11/2015 | Wilairat et al. | |
| 2016/0131902 A1 | 5/2016 | Ambrus et al. | |
| 2019/0187479 A1* | 6/2019 | Nishizawa | G06F 3/0304 |
| 2020/0250488 A1 | 8/2020 | Linden | |
| 2021/0166661 A1* | 6/2021 | Wakabayashi | G09G 5/38 |
| 2021/0173477 A1 | 6/2021 | Barkman et al. | |
| 2021/0240260 A1* | 8/2021 | Ronkainen | G06F 3/011 |
| 2021/0373658 A1* | 12/2021 | Jeong | H04L 67/566 |
| 2022/0397958 A1 | 12/2022 | Aboussouan | |

FOREIGN PATENT DOCUMENTS

| | | | |
|---|---|---|---|
| KR | 10-2020-0098509 A | 8/2020 | |
| KR | 10-2021-0147837 A | 12/2021 | |
| KR | 10-2022-0100051 A | 7/2022 | |
| KR | 10-2613781 B1 | 12/2023 | |
| KR | 10-2625583 B1 | 1/2024 | |

* cited by examiner

WEARABLE DEVICE, METHOD, AND NON-TRANSITORY COMPUTER READABLE STORAGE MEDIUM FOR EYE CALIBRATION

CROSS-REFERENCE TO RELATED APPLICATIONS

This application is a by-pass continuation application of International Application No. PCT/KR2025/002083, filed on Feb. 12, 2025, which is based on and claims priority to Korean Patent Application Nos. 10-2024-0056192, filed on Apr. 26, 2024, in the Korean Intellectual Property Office, and 10-2024-0080674, filed on Jun. 20, 2024, in the Korean Intellectual Property Office, the disclosures of which are incorporated by reference herein in their entireties.

BACKGROUND

1. Field

The disclosure relates to a wearable device, a method, and a non-transitory computer-readable storage medium for eye calibration.

2. Description of Related Art

In order to provide an enhanced user experience, an electronic device has been developed to provide an augmented reality (AR) service that displays information generated by a computer in connection with an external object in the real-world. The electronic device may be a wearable device capable of being worn by a user. For example, the electronic device may be AR glasses or a head-mounted device (HMD).

The wearable device may track a movement of a pupil of the user's eyes or a gaze of the user, based on an image about the eyes. The wearable device may determine what the user looks at or focused on through the gaze tracking.

The above-described information may be provided as related art for the purpose of helping understanding of the present disclosure. No argument or decision is made as to whether any of the above description may be applied as a prior art related to the present disclosure.

SUMMARY

Provided is a wearable device. According to an aspect of the disclosure, a wearable device includes: a display system including a first display and a second display, the first display and the second display facing eyes of a user wearing the wearable device, a plurality of cameras arranged to obtain an image including the eyes of the user wearing the wearable device, at least one processor comprising processing circuitry; and memory including one or more storage mediums and storing instructions, wherein the instructions, when executed by the at least one processor individually or collectively, cause the wearable device to: display objects at least at different time points on a three dimensional (3D) screen displayed through the display system, identify, based on the image, gazes looking at the objects, identify, based on the identified gazes, errors associated with the gazes, wherein the errors indicate differences between display positions of the objects and focal positions of the gazes, and wherein the focal positions have one-to-one correspondences with the objects, display a visual object on a background screen on the display system to move the visual object through partial display positions of the display positions, which are selected based on the errors, and based on another gaze looking at the visual object, correct the errors.

According to an aspect of the disclosure, a method executed by a wearable device including a display system including a first display and a second display facing eyes of a user wearing the wearable device, and a plurality of cameras arranged to obtain an image including the eyes of the user, includes: displaying objects at least at different time points on a three dimensional (3D) screen displayed through the display system, identify, based on the image, gazes looking at the objects, identifying, based on the identified gazes, errors associated with the gazes, wherein the errors indicate differences between display positions of the objects and focal positions of the gazes, and wherein the focal positions have a one-to-one correspondence with the objects, displaying a visual object on a background screen on the display system to move the visual object through partial display positions of the display positions, which are selected based on the errors, and based on another gaze looking at the visual object, correcting the errors.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
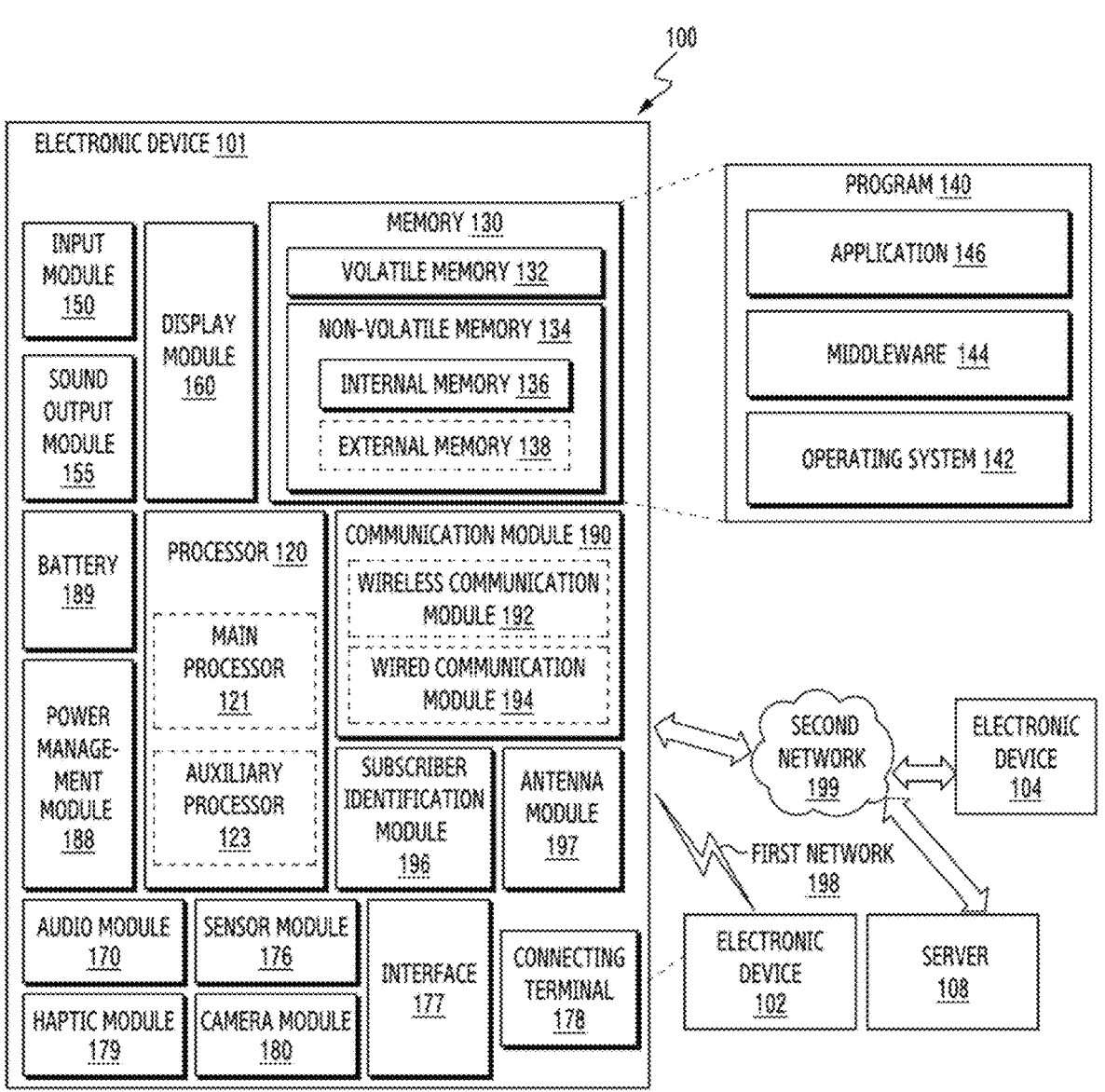
FIG. 1 illustrates an electronic device 101 in a network environment 100 according to one or more embodiments.

FIG. 1 illustrates an electronic device 101 in a network environment 100 according to one or more embodiments.

In FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to one or more embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
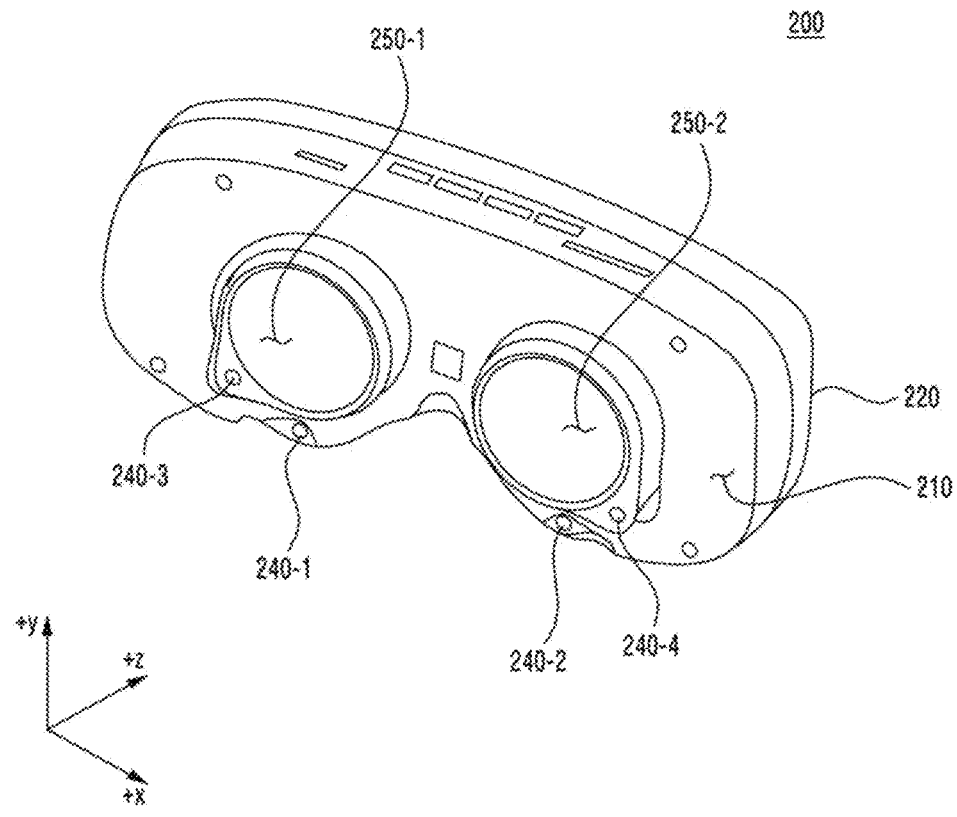
FIG. 2A illustrates an example of an exterior of a wearable device according to an embodiment.
Figure 2B:
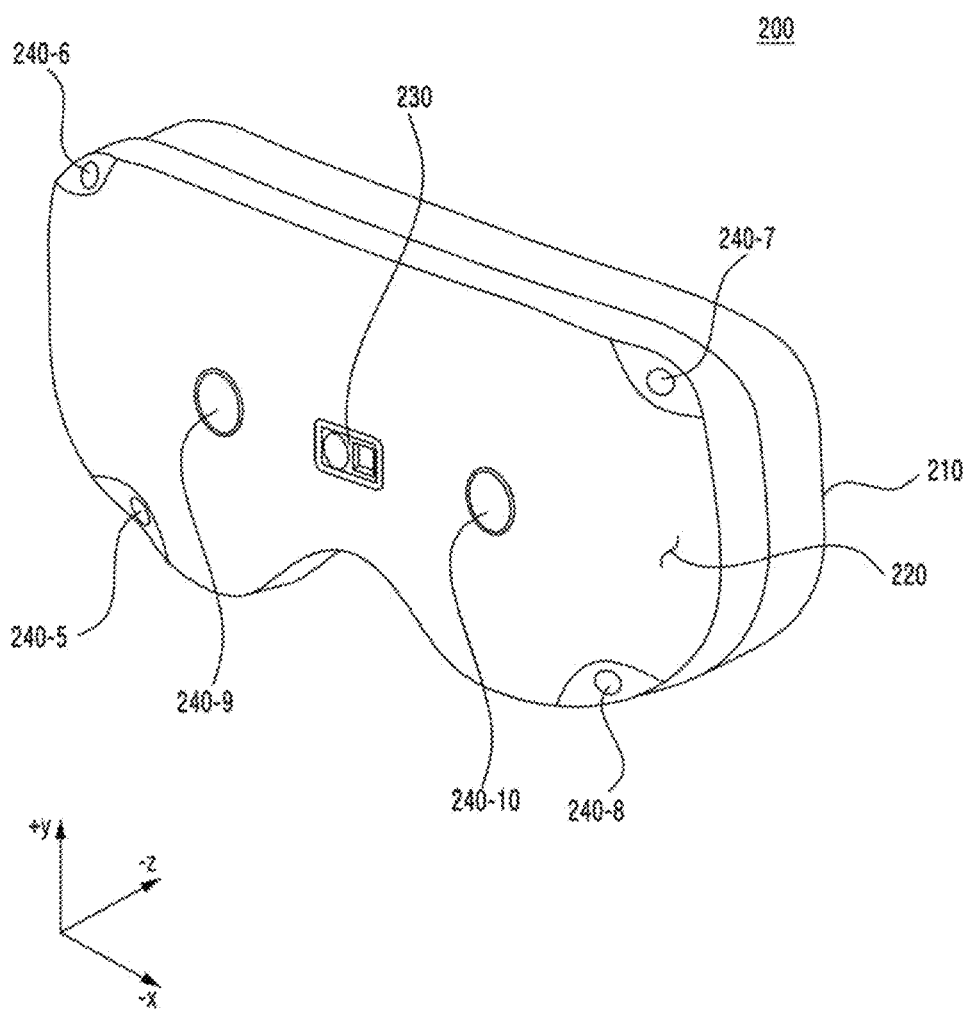
FIG. 2B illustrates an example of an exterior of a wearable device according to an embodiment.

FIG. 2A illustrates an example of an exterior of a wearable device according to an embodiment. FIG. 2B illustrates an example of an exterior of a wearable device according to an embodiment.

A wearable device 200 of FIGS. 2A and 2B may correspond to the electronic device 101 of FIG. 1. According to an embodiment, the wearable device 200 may be substantially the same as the electronic device 101 of FIG. 1, and may be implemented to be wearable on a user's body. In an embodiment, each of the external electronic devices 102 and 104 of FIG. 1 may be the same or a different type of a device as the electronic device 101 or the wearable device 200. According to an embodiment, all or some of operations executed in the electronic device 101 or the wearable device 200 may be executed in one or more external electronic devices among external electronic devices 102, 104, or 108. For example, in the case that the electronic device 101 or the wearable device 200 needs to perform a function or a service automatically, or in response to a request from the user or another device, the electronic device 101 or the wearable device 200 may additionally request the one or more external electronic devices to perform at least a portion of the function or the service, instead of executing the function or the service by themselves. The one or more external electronic devices which received the request may execute at least a portion of the function or the service that is requested, or an additional function or service associated with the request, and then transmit a result of the execution to the electronic device 101 or the wearable device 200. The electronic device 101 or the wearable device 200 may process the result as it is or additionally, and then provide the result as at least a portion of a response to the request.

In FIG. 2A, a first surface 210 of the wearable device 200 according to an embodiment may have a form that is attachable on a body part (e.g., a face of the user) of the user. The wearable device 200 according to an embodiment may have a form factor for being worn on a head of the user. In an embodiment, the wearable device 200 may be worn on a part (e.g., the head) of the body of the user. In an embodiment, the wearable device 200 may be referred to as a wearable device in terms of being worn on the part (e.g., the head) of the body of the user. In an embodiment, the wearable device 200 may further include a strap and/or one or more temples for being fixed on the body part of the user.

The wearable device 200 according to an embodiment may include a first display 250-1 and a second display 250-2. For example, the first display 250-1 and the second display 250-2 may be disposed at positions corresponding to a left eye and a right eye of the user, respectively. According to an embodiment, the wearable device 200 may further include rubber or silicon packing formed on the first surface 210 and for preventing or reducing interference by light (e.g., ambient light) different from light emitted from the first display 250-1 and the second display 250-2.

In an embodiment, the wearable device 200 may provide an augmented reality (AR), a virtual reality (VR), or a mixed reality (MR) in which the augmented reality and the virtual reality are mixed to the user wearing the wearable device 200 through the displays 250-1 and 250-2. For example, the wearable device 200 may provide the user with a user experience (e.g., video see-through (VST)) in which a real object and a reference object are mixed, by combining the reference object in a frame that is displayed through the first display 250-1 and the second display 250-2 and includes the real object.

The wearable device 200 according to an embodiment may include the first display 250-1 and/or the second display 250-2 spaced apart from the first display 250-1. For example, the first display 250-1 and the second display 250-2 may be disposed at the positions corresponding to the left eye and the right eye of the user, respectively.

The wearable device 200 according to an embodiment may include cameras 240-1 and 240-2 for capturing and/or recognizing the face of the user. The cameras 240-1 and 240-2 may be referred to as a face tracking (FT) camera.

The wearable device 200 according to an embodiment may include cameras 240-3 and 240-4 for capturing or tracking both eyes of the user adjacent to each of the first display 250-1 and the second display 250-2. The cameras 240-3 and 240-4 may be referred to as an eye tracking (ET) camera.

The cameras 240-3 and 240-4 may output data (or an image) indicating a gaze of the user wearing the wearable device 200. For example, the wearable device 200 may detect the gaze of the user from an image including a pupil of the user obtained through the cameras 240-3 and 240-4. In an embodiment, the data (or the image) indicating the gaze may include an image with respect to the eyes of the user. In an embodiment, the data (or the image) indicating the gaze may include an image with respect to the pupil and an iris of the eyes of the user.

The wearable device 200 may identify a location of the pupil and/or the iris of the user, based on an image indicating light reflected from the iris of the user obtained through the gaze cameras 240-3 and 240-4. The wearable device 200 may identify the gaze of the user and/or a movement of the gaze, based on the location and/or a change of the location of the pupil and/or the iris of the user. In an embodiment, the wearable device 200 may further include a light source (e.g., a light emitting diode (LED)) that emits light toward a subject (e.g., the eyes and the face of the user, and/or an external object in a field of view (FoV)) captured using the gaze cameras 240-3 and 240-4. The light source may emit light having an infrared wavelength.

The displays 250-1 and 250-2 described with reference to FIG. 2A may correspond to the display module 160 of FIG. 1. The cameras 240-1, 240-2, 240-3, and 240-4 described with reference to FIG. 2A may correspond to the camera module 180 of FIG. 1. However, the disclosure is not limited to the above embodiment. A portion (e.g., the cameras 240-3, and 240-4) of the cameras 240-1, 240-2, 240-3, and 240-4 described with reference to FIG. 2A may correspond to the sensor module 176 of FIG. 1.

In FIG. 2B, cameras 240-5, 240-6, 240-7, 240-8, 240-9, and 240-10 and/or a depth sensor 230 for obtaining information related to an external environment of the wearable device 200 may be disposed on a second surface 220 opposite to the first surface 210 of FIG. 2A. For example, the cameras 240-5, 240-6, 240-7, 240-8, 240-9, and 240-10 may be disposed on the second surface 220 to recognize an external object different from the wearable device 200. The cameras 240-5, 240-6, 240-7, 240-8, 240-9, and 240-10 described with reference to FIG. 2B may correspond to the camera module 180 of FIG. 1. The depth sensor 230 described with reference to FIG. 2B may correspond to the sensor module 176 of FIG. 1.

For example, using the cameras 240-9 and 240-10, the wearable device 200 may obtain an image or a video to be transmitted to each of (or at least one of) two eyes of the user. The camera 240-9 may be disposed on the second surface 220 of the wearable device 200 to obtain an image to be displayed through the second display 250-2 corresponding to the right eye of the two eyes. The camera 240-10 may be disposed on the second surface 220 of the wearable device 200 to obtain an image to be displayed through the first display 250-1 corresponding to the left eye of the two eyes.

The wearable device 200 according to an embodiment may include the depth sensor 230 disposed on the second surface 220 to identify a distance between the wearable device 200 and the external object. Using the depth sensor 230, the wearable device 200 may obtain spatial information (e.g., a depth map) on at least a portion of the field of view (FoV) of the user wearing the wearable device 200.

The wearable device 200 according to an embodiment may include at least one of a gyro sensor, a gravity sensor, and/or an acceleration sensor for detecting a posture of the wearable device 200 and/or a posture of the body part (e.g., the head) of the user wearing the wearable device 200. Each of the gravity sensor and the acceleration sensor may measure acceleration and/or acceleration of gravity, based on designated three-dimensional axes (e.g., an x-axis, a y-axis, and a z-axis) perpendicular to each other. The gyro sensor may measure an angular velocity of each of the designated three-dimensional axes (e.g., the x-axis, the y-axis, and the z-axis). The at least one of the gravity sensor, the acceleration sensor, and the gyro sensor may be referred to as an inertial measurement unit (IMU). The wearable device 200 according to an embodiment may identify motion and/or a gesture of the user, performed to execute or cease a specific function of the wearable device 200 based on the IMU. In an embodiment, the IMU may correspond to the sensor module 176 of FIG. 1.

Figure 3A:
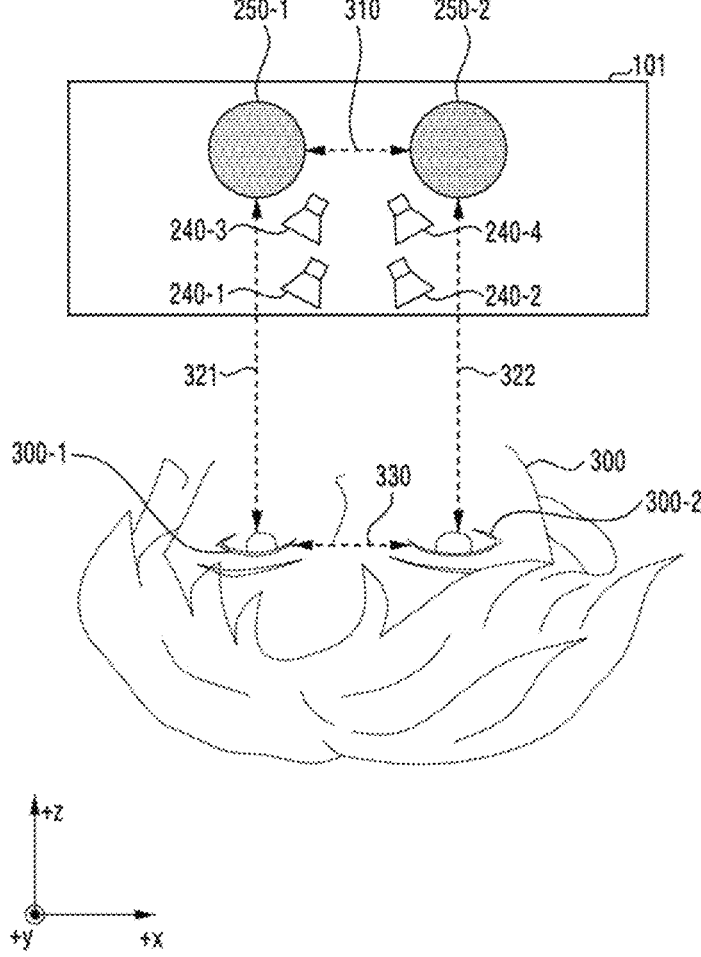
FIG. 3A illustrates a positional relationship between displays and two eyes of a user.
Figure 3B:
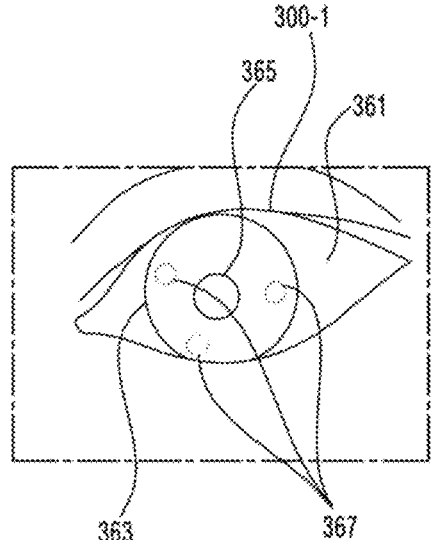
FIG. 3B illustrates an example of an image of a left eye of a user.
Figure 3C:
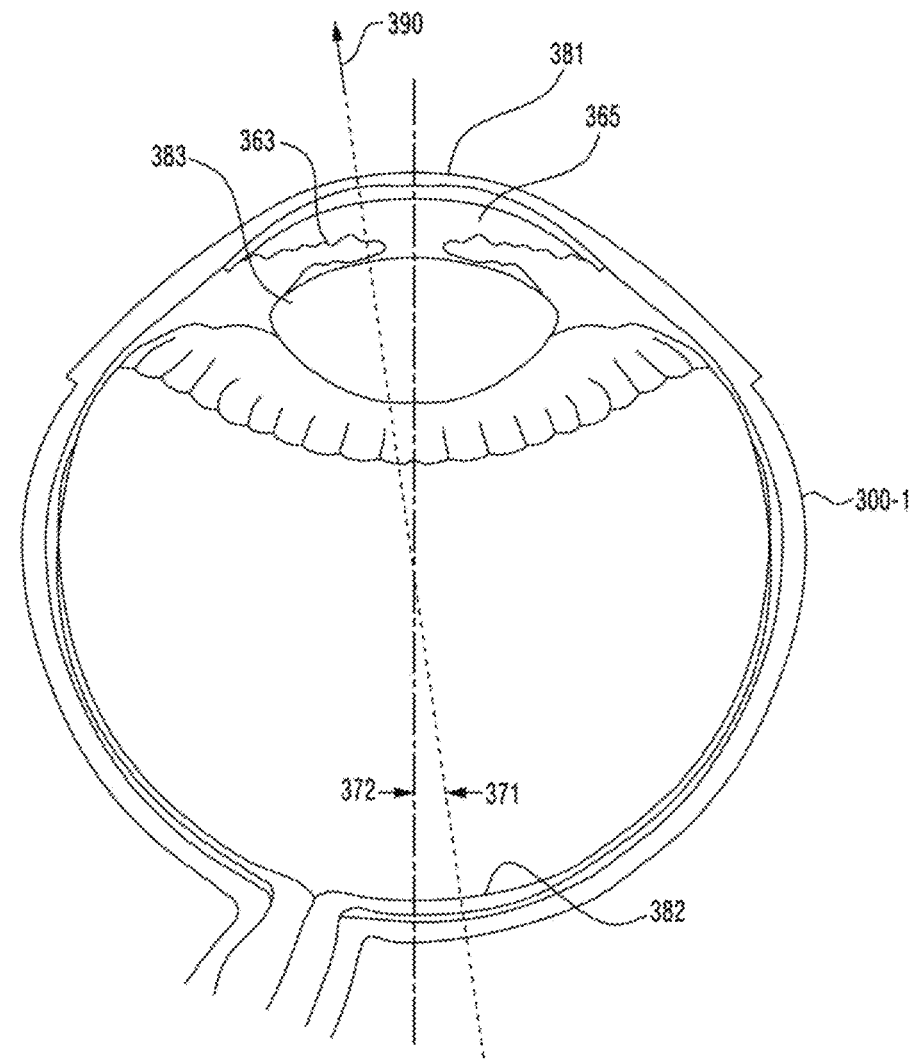
FIG. 3C illustrates an anatomical structure of a left eye of a user.

FIG. 3A illustrates a positional relationship between displays 250-1 and 250-2 and two eyes 300-1 and 300-2 of a user 300. FIG. 3B illustrates an example of an image of a left eye 300-1 of the user 300. FIG. 3C illustrates an anatomical structure of a left eye 300-1 of the user 300.

FIGS. 3A, 3B, and 3C may be described with reference to the electronic device 101 of FIG. 1, and the wearable device 200 of FIG. 2A and FIG. 2B. Operations described with reference to FIGS. 3A, 3B, and 3C may be executed by an electronic device 101 and/or a processor 120 of the electronic device 101.

In an embodiment, the cameras 240-3 and 240-4 (e.g., cameras for eye tracking) may be inside a housing of the electronic device 101 such that camera lenses of the cameras 240-3 and 240-4 face the eyes 300-1 and 300-2 of the user 300, when the user 300 wears the electronic device 101. In an embodiment, the cameras 240-3 and 240-4 may be installed for the left eye 300-1 and the right eye 300-2, respectively. A performance and a standard of each camera may be identical.

In an embodiment, the cameras 240-3 and 240-4 may be in a fixed barrel around the displays 250-1 and 250-2. In an embodiment, the cameras 240-3 and 240-4 may be arranged in the electronic device 101 to face the user 300. In an embodiment, the cameras 240-3 and 240-4 may be in a space between the displays 250-1 and 250-2. For example, when looking at a first surface (e.g., the first surface 210 of FIGS. 2A and 2B) (e.g., a surface attached to a face of the user 300) of the electronic device 101, the camera 240-3 may be on a right side of the display 250-1. For example, when looking at the first surface (e.g., the first surface 210 of FIGS. 2A and 2B) (e.g., the surface attached to the face of the user 300) of the electronic device 101, the camera 240-4 may be on a left side of the display 250-2. For example, a separation distance between the cameras 240-3 and 240-4 may be shorter than a separation distance between the displays 250-1 and 250-2. However, the disclosure is not limited to the above embodiment. In an embodiment, the cameras 240-3 and 240-4 may be in a space other than the space between the displays 250-1 and 250-2. For example, when looking at the first surface (e.g., the first surface 210 of FIGS. 2A and 2B) (e.g., the surface attached to the face of the user 300) of the electronic device 101, the camera 240-3 may be on a left side of the display 250-1. For example, when looking at the first surface (e.g., the first surface 210 of FIGS. 2A and 2B) (e.g., the surface attached to the face of the user 300) of the electronic device 101, the camera 240-4 may be on a right side of the display 250-2. For example, the separation distance between the cameras 240-3 and 240-4 may be longer than the separation distance between the displays 250-1 and 250-2.

In an embodiment, the electronic device 101 may generate (or update) an eye model of the user 300. In an embodiment, the electronic device 101 may generate (or update) the eye model of the user 300, when the electronic device 101 is initially driven (e.g., out of box experience (OOBE)), and/or based on an occurrence of a designated event. In an embodiment, the designated event may be registration (or change) of a user account of the user 300 in the electronic device 101. In an embodiment, the designated event may include a request of the user 300. For example, the request of the user 300 may be identified by the electronic device 101, based on selection of a user interface element (or graphic UI (GUI)) for requesting the generation (or update) of the eye model of the user 300 on a three-dimensional (3D) screen displayed through the displays 250-1 and 250-2 of the electronic device 101. However, the disclosure is not limited to the above embodiment. For example, the request of the user 300 may be identified based on recognition of a command of the user 300 through voice recognition.

In an embodiment, the electronic device 101 may obtain images through cameras 240-1, 240-2, 240-3, and 240-4 to generate (or update) the eye model of the user 300. In an embodiment, the images for generating (or updating) the eye model of the user 300 may include at least a portion of the face of the user 300. In an embodiment, the images for generating (or updating) the eye model of the user 300 may include at least a portion of the eyes 300-1 and 300-2 of the user 300.

In an embodiment, the electronic device 101 may obtain the images through cameras 240-1, 240-2, 240-3, and 240-4 to generate (or update) the eye model of the user 300 while the user 300 looks at the 3D screen displayed through the displays 250-1 and 250-2. The 3D screen displayed to generate (or update) the eye model of the user 300 may be a screen displayed according to execution of an application for eye calibration. Hereinafter, the screen displayed according to the execution of the application for the eye calibration may be described with reference to FIGS. 4A and 4B.

In an embodiment, the electronic device 101 may obtain feature information of the user 300 obtained through the images to generate (or update) the eye model of the user 300. In an embodiment, the electronic device 101 may obtain feature information of the user 300 based on an image obtained from the cameras 240-1, 240-2, 240-3, and 240-4. In an embodiment, the electronic device 101 may obtain feature information of the user 300 based on an image including the at least a portion of the face of the user 300 obtained from the cameras 240-1 and 240-2. In an embodiment, the electronic device 101 may obtain feature information of the user 300, based on an image including the at least a portion of the eyes 300-1 and 300-2 of the user 300 obtained from the cameras 240-3 and 240-4.

In an embodiment, the feature information may include a positional relationship between the displays 250-1 and 250-2 and the two eyes 300-1 and 300-2 of the user 300. In FIG. 3A, the positional relationship may include information on a first distance 310 between the displays 250-1 and 250-2, information on a second distance 321 between the first display 250-1 and the left eye 300-1, information on a third distance 322 between the second display 250-2 and the right eye 300-2, and information on a fourth distance 330 between the two eyes 300-1 and 300-2. Hereinafter, the second distance 321 and the third distance 322 may be referred to as 'eye relief' in this disclosure. The information on the second distance 321 and the information on the third distance 322 may be referred to as 'eye relief information' in this disclosure. The fourth distance 330 may be referred to as 'an inter pupillary distance (IPD)' in this disclosure. The information on the fourth distance 330 may be referred to as 'IPD information' in this disclosure.

In an embodiment, the feature information may include location information of feature portions of the two eyes 300-1 and 300-2 of the user 300. In an embodiment, in FIG. 3B, the feature portions may include a sclera 361, an iris 363, a pupil 365, and/or glints 367 in which reflection by a light source occurs. In FIG. 3B, only the left eye 300-1 is illustrated, but this is only an example. Feature portions with respect to the right eye 300-2 may also include a sclera, an iris, a pupil, and/or glints in which reflection by a light source occurs.

In an embodiment, the electronic device 101 may generate an eye model based on the feature information. In an embodiment, the eye model may include one or more parameters. In FIG. 3C, the one or more parameters may indicate a radius of curvature of a cornea 381 of each of (or at least one of) the two eyes 300-1 and 300-2, and a difference in an angle (or a "kappa angle") between a visual axis 371 and an optical axis 372. The visual axis 371 may be a straight line passing through a center of a lens 383 from a fovea 382. The optical axis 372 may be a straight line passing through the pupil 365 from a rotation center of each of (or at least one of) the two eyes 300-1 and 300-2. For example, the visual axis 371 is inclined approximately 5 degrees in a horizontal inward direction and approximately 1 degree in a vertical downward direction from a center direction of the pupil 365, from the optical axis 372. The one or more parameters may indicate a position of each of (or at least one of) the two eyes 300-1 and 300-2, a radius of each of (or at least one of) the two eyes 300-1 and 300-2, a size of the iris 363, a radius of the iris 363, a radius of the pupil 365, a center position of the pupil 365, and a position of at least one glints 367. In an embodiment, a gaze direction 390 of the user 300 may correspond to a direction of the visual axis 371. In an embodiment, tracking a gaze of the user 300 may include obtaining the gaze direction 390 of the user 300. However, the disclosure is not limited to the above embodiment.

Figure 4A:
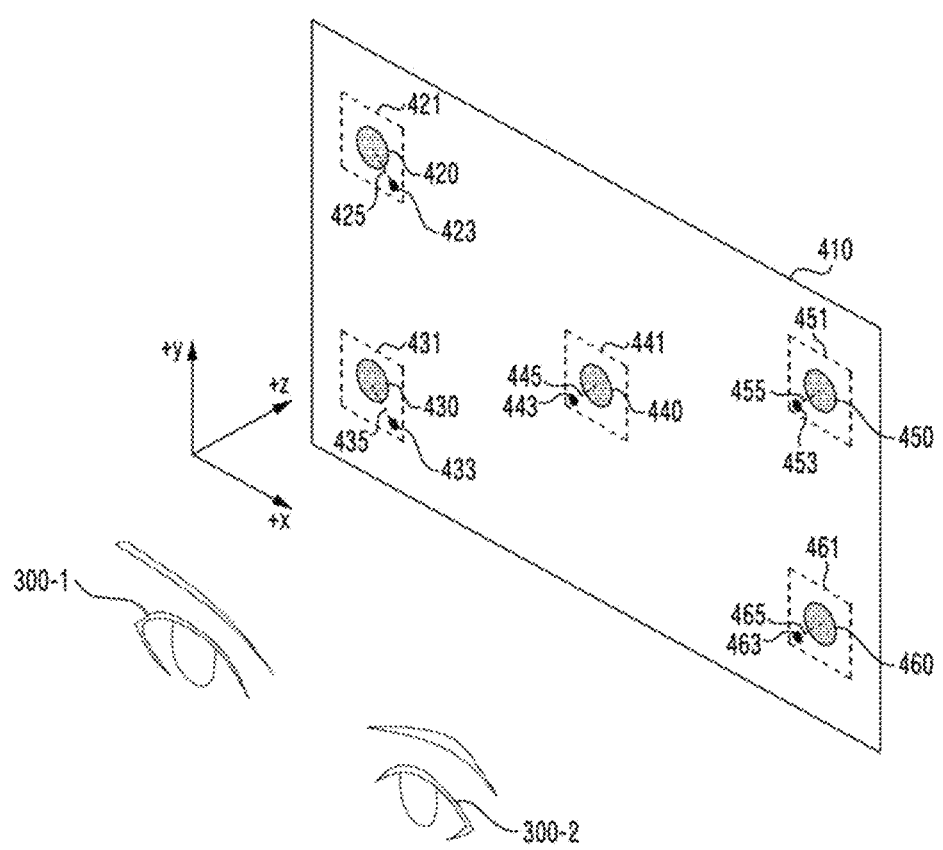
FIG. 4A illustrates an example of a screen for calibrating a gaze of a user according to an embodiment.
Figure 4B:
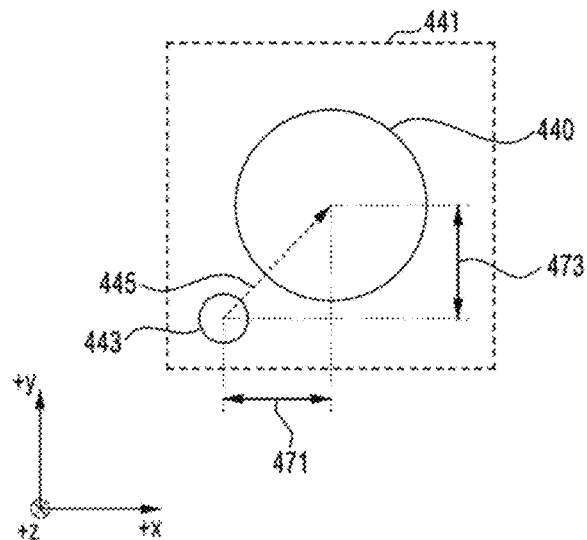
FIG. 4B illustrates an example of an error between an object and a gaze according to an embodiment.

FIG. 4A illustrates an example of a screen for calibrating a gaze of the user according to an embodiment. FIG. 4B illustrates an example of an error between an object and a gaze according to an embodiment.

FIGS. 4A and 4B may be described with reference to the electronic device 101 of FIG. 1, and the wearable device 200 of FIG. 2A and FIG. 2B. FIGS. 4A and 4B may be described with reference to FIGS. 3A, 3B, and 3C. Operations described with reference to FIGS. 4A and 4B may be executed by an electronic device 101 and/or a processor 120 of the electronic device 101.

In an embodiment, the electronic device 101 may perform eye calibration for correcting data indicating a gaze identified through an eye model of the user 300. In FIG. 4A, the electronic device 101 may display virtual reference objects 420, 430, 440, 450, and 460 knowing a position (a coordinate) in a state in which the user 300 wears the electronic device 101 on a three dimensional (3D) screen 410. For example, the electronic device 101 may display the virtual reference objects 420, 430, 440, 450, and 460 on the 3D screen 410 by executing an application for the eye calibration. In an embodiment, the electronic device 101 may sequentially display the reference objects 420, 430, 440, 450, and 460 on the 3D screen 410 for the eye calibration.

For example, the electronic device 101 may obtain images of two eyes 300-1 and 300-2 through the cameras 240-3, 240-4, while the reference objects 420, 430, 440, 450, and 460 is sequentially displayed on the 3D screen 410. For example, the electronic device 101 may obtain the images of the two eyes 300-1 and 300-2 through the cameras 240-3 and 240-4, when the reference object 420 is displayed at a first time point on the 3D screen 410. For example, the electronic device 101 may obtain the images of the two eyes 300-1 and 300-2 through the cameras 240-3 and 240-4, when the reference object 430 is displayed at a second time point that does not overlap with the first time point on the 3D screen 410. For example, the electronic device 101 may obtain the images of the two eyes 300-1 and 300-2 through the cameras 240-3 and 240-4, when the reference object 440 is displayed at a third time point that does not overlap the first time point and the second time point on the 3D screen 410.

For example, the electronic device 101 may obtain the images of the two eyes 300-1 and 300-2 through the cameras 240-3 and 240-4, when the reference object 450 is displayed at a fourth time point that does not overlap with the first time point, the second time point, and the third time point on the 3D screen 410. For example, the electronic device 101 may obtain the images of the two eyes 300-1 and 300-2 through the cameras 240-3 and 240-4, when the reference object 450 is displayed at a fourth time point that does not overlap with the first time point, the second time point, and the third time point on the 3D screen 410.

For example, the electronic device 101 may identify gazes 423, 433, 443, 453, and 463, based on the images of the two eyes 300-1, 300-2 obtained, when the reference objects 420, 430, 440, 450, and 460 is sequentially displayed on the 3D screen 410. For example, the electronic device 101 may identify the gazes 423, 433, 443, 453, and 463, based on feature information (e.g., a location of a glint 367) of the images of the two eyes 300-1, and 300-2, and the eye model. For example, the electronic device 101 may identify the gazes 423, 433, 443, 453, and 463 (or visual axes 371) corresponding to optical axes 372 according to the images of the two eyes 300-1, 300-2, based on the eye model.

For example, the electronic device 101 may obtain the images of the two eyes 300-1 and 300-2 in which the gazes 423, 433, 443, 453, 453, and 463 are positioned within selection areas 421, 431, 441, 451, and 461 of the reference objects 420, 430, 440, 450, and 460, while the reference objects 420, 430, 440, 450, and 460 is sequentially displayed on the 3D screen 410. For example, the selection areas 421, 431, 441, 451, and 461 may indicate areas where it is determined that the user 300 looked at the reference object.

For example, in a case that a gaze of the user 300 is positioned within a selection area of a specific object, the electronic device 101 may determine that the user 300 looks at the specific object. In FIG. 4A, the selection areas 421, 431, 441, 451, and 461 are illustrated as a quadrangle, but it is only an example. For example, the selection areas 421, 431, 441, 451, and 461 may have various shapes (e.g., circle, oval, and polygon). In FIG. 4A, the selection areas 421, 431, 441, 451, and 461 are illustrated to be larger than the reference objects 420, 430, 440, 450, and 460, but it is only an example. For example, sizes of the selection areas 421, 431, 441, 451, and 461 may be substantially the same as sizes of the reference objects 420, 430, 440, 450, and 460. However, the disclosure is not limited to the above embodiments.

For example, the electronic device 101 may identify errors 425, 435, 445, 455, and 465 between center positions of the reference objects 420, 430, 440, 450, and 460 and the gazes 423, 433, 443, 453, and 463. In an embodiment, the errors 425, 435, 445, 455, and 465 may be three-dimensional errors. For example, the errors 425, 435, 445, 455, and 465 may include an error in an x-axis direction, an error in a y-axis direction, and an error in a z-axis direction. For example, in FIG. 4B, an error 445 may include an error 471 in the x-axis direction, an error 473 in the y-axis direction, and an error in the z-axis direction. For example, the errors 425, 435, 445, 455, and 465 may indicate a distance difference between the center positions of the reference objects 420, 430, 440, 450 and 460 and the gazes 423, 433, 443, 453, and 463. However, the disclosure is not limited to the above embodiment.

In an embodiment, the electronic device 101 may correct the gazes 423, 433, 443, 453, 453, and 463 based on the errors 425, 435, 445, 455 and 465. For example, the electronic device 101 may correct the gazes 423, 433, 443, 453, 453, and 463 by correcting an angle (or kappa angle) difference between the visual axis 371 and the optical axis 372 based on the errors 425, 435, 445, 455, and 465.

For example, the electronic device 101 may identify parameters for correcting the gazes 423, 433, 443, 453, and 463, based on the errors 425, 435, 445, 455 and 465. For example, the electronic device 101 may correct the gazes 423, 433, 443, 453, and 463 based on the identified parameters. For example, the electronic device 101 may set (or determine) parameters with respect to each of (or at least one of) positions of the 3D screen 410. For example, the electronic device 101 may set parameters with respect to each of (or at least one of) positions where the reference objects 420, 430, 440, 450, and 460 are displayed on the 3D screen 410. Hereinafter, a parameter for correcting a gaze identified through the eye model may be referred to as "an error correction parameter."

Figure 5:
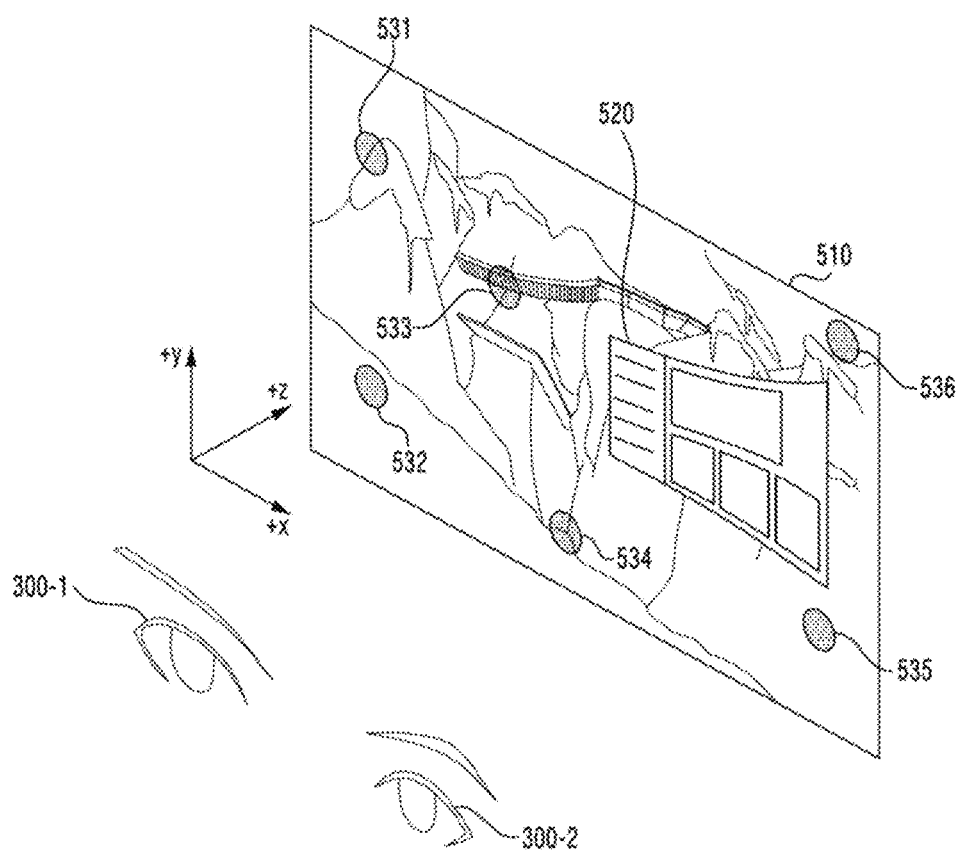
FIG. 5 illustrates an example of a screen displayed by a wearable device according to an embodiment.

FIG. 5 illustrates an example of a screen displayed by a wearable device according to an embodiment.

FIG. 5 may be described with reference to the electronic device 101 of FIG. 1, and the wearable device 200 of FIG. 2A and FIG. 2B. FIG. 5 may be described with reference to FIG. 3A, FIG. 3B, FIG. 3C, FIG. 4A and FIG. 4B. Operations described with reference to FIG. 5 may be executed by an electronic device 101 and/or a processor 120 of the electronic device 101.

In an embodiment, the electronic device 101 may display a 3D screen. For example, the electronic device 101 may display the 3D screen after performing eye calibration. In an embodiment, the 3D screen may be configured to provide media content for reinforcing immersion in a virtual world, based on an augmented reality (AR), a virtual reality environment (VR), a mixed environment (MR), and/or an extended reality (XR).

In an embodiment, the 3D screen may include a background area (or a background screen) 510. In an embodiment, the background area 510 may also be referred to as a background screen. In an embodiment, the background area 510 may be distinguished from an execution screen 520 of an application. In an embodiment, the background area 510 may be an area in which a wallpaper is displayed. In an embodiment, the wallpaper may be an image determined according to a basic setting or an image determined according to a setting of the user 300.

In an embodiment, the execution screen 520 of the application may be displayed on a partial area of the 3D screen. However, the disclosure is not limited to the above embodiment. In an embodiment, the execution screen 520 of the application may be displayed on an entire area of the 3D screen.

In an embodiment, the 3D screen may include at least one visual object 531, 532, 533, 534, 535, and 536. In an embodiment, the visual objects 531, 532, and 533 may indicate the background area 510 or a real environment (e.g., the current weather). For example, the visual objects 531, 532, and 533 may indicate the background area 510 or the real environment (e.g., current weather), such as snow, rain, a petal, and/or a leaf. However, the disclosure is not limited to the above embodiment.

In an embodiment, the visual object 534 may be a panel. For example, the visual object 534 may include icons of applications. For example, the visual object 534 may include an icon for controlling the electronic device 101. For example, the icon for controlling the electronic device 101 may include an icon for changing a mode (e.g., a sound mode or a vibration mode) of the electronic device 101. However, the disclosure is not limited to the above embodiments.

In an embodiment, the visual objects 535 and 536 may be a widget of an application. For example, the widget may be a graphic user interface (GUI) for controlling a portion of functions of the application related to the widget and/or displaying information.

In an embodiment, a gaze error may occur while providing the media content based on the VR, the AR, and/or the MR to the user 300 wearing the electronic device 101. For example, the gaze error may occur after the eye calibration of the user 300.

For example, the gaze error may occur due to a slippage. In an embodiment, the slippage may occur by a movement (e.g., a head movement of the user 300) of the user 300. In an embodiment, the slippage may refer to or correspond to distances 321 and 322 (or eye relief) between displays 250-1 and 250-2 and two eyes 300-1 and 300-2 measured when the user 300 wears the electronic device 101 being changed. In an embodiment, the slippage may refer to eye reliefs being changed compared to a time point when the user 300 wears the electronic device 101.

However, the disclosure is not limited to the above embodiment. For example, the slippage may occur by an element (or an environment) other than the movement (e.g., the head movement of the user 300) of the user 300. For example, the slippage may occur by an element (or an environment) that changes (or reduces) a contact state (or a frictional force) between the user 300 and the electronic device 101. For example, the slippage may occur more easily in a situation where the contact state (or the frictional force) between the user 300 and the electronic device 101 deteriorates (or reduces) due to sweat of the user 300 or an environmental change (e.g., a humidity change, and/or a temperature change).

For example, the gaze error may occur based on the user 300 re-wearing the electronic device 101. Herein, the user 300 re-wearing the electronic device 101 may mean that the user 300 takes off the electronic device 101 for a while and then wears it immediately. For example, due to the user 300 re-wearing the electronic device 101, eye reliefs after re-wearing of the electronic device 101 and eye reliefs before re-wearing of the electronic device 101 may be different from each other.

For example, the gaze error may occur due to a state of the user 300 being changed after the eye calibration. For example, the change in the state of the user 300 may change feature information of the user 300. For example, the change in the state of the user 300 may include wearing a lens or glasses. For example, wearing the lens or the glasses may include wearing them on the user 300 (e.g., the glasses resting on a nose of the user, and the lens being placed over the two eyes 300-1 and 300-2 of the user 300). For example, wearing the lens or the glasses may include attaching them to the electronic device 101 (e.g., the lens being attached to the displays 250-1 and 250-2).

For example, the change in the state of the user 300 may include or correspond to a change (e.g., a wound around the eyes, and a change in thickness around the eyes) that changes the eye reliefs.

For example, in the case that the gaze error occurs, time in which the electronic device 101 determines that a gaze of the user 300 faces at the visual objects 531, 532, 533, 534, 535, and 536 may be longer. For example, in the case that the gaze error occurs, the electronic device 101 may determine that the gaze of the user 300 faces an object different from the visual objects 531, 532, 533, 534, 535, and 536 in which the user 300 is actually looking at.

Accordingly, in the case that the gaze error occurs, the electronic device 101 may perform a session (e.g., the eye calibration) for reducing the gaze error. However, in the case of the eye calibration, considerable time may be required. In addition, in order for the electronic device 101 to perform eye calibration, as a screen of the application for the eye calibration is displayed, providing media content being provided to the user 300 may be stopped.

Therefore, a separate method for reducing the gaze error may be required without interfering with reality (e.g., the VR, the AR, and/or the XR) in which the user 300 is immersed.

Hereinafter, a method for reducing the gaze error without interfering with the reality (e.g., the VR, the AR, and/or the XR) in which the user 300 is immersed may be described with reference to FIGS. 6 to 7B.

Figure 6:
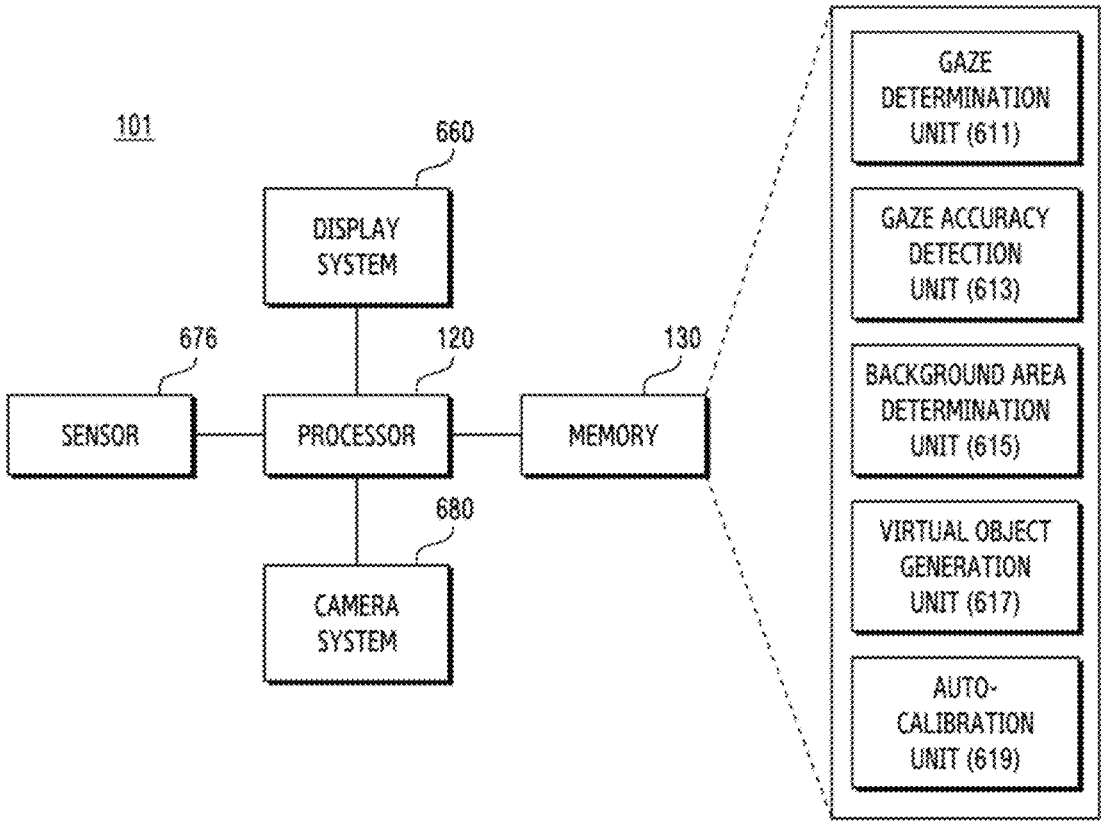
FIG. 6 illustrates a block diagram of a wearable device according to an embodiment.
Figure 7A:
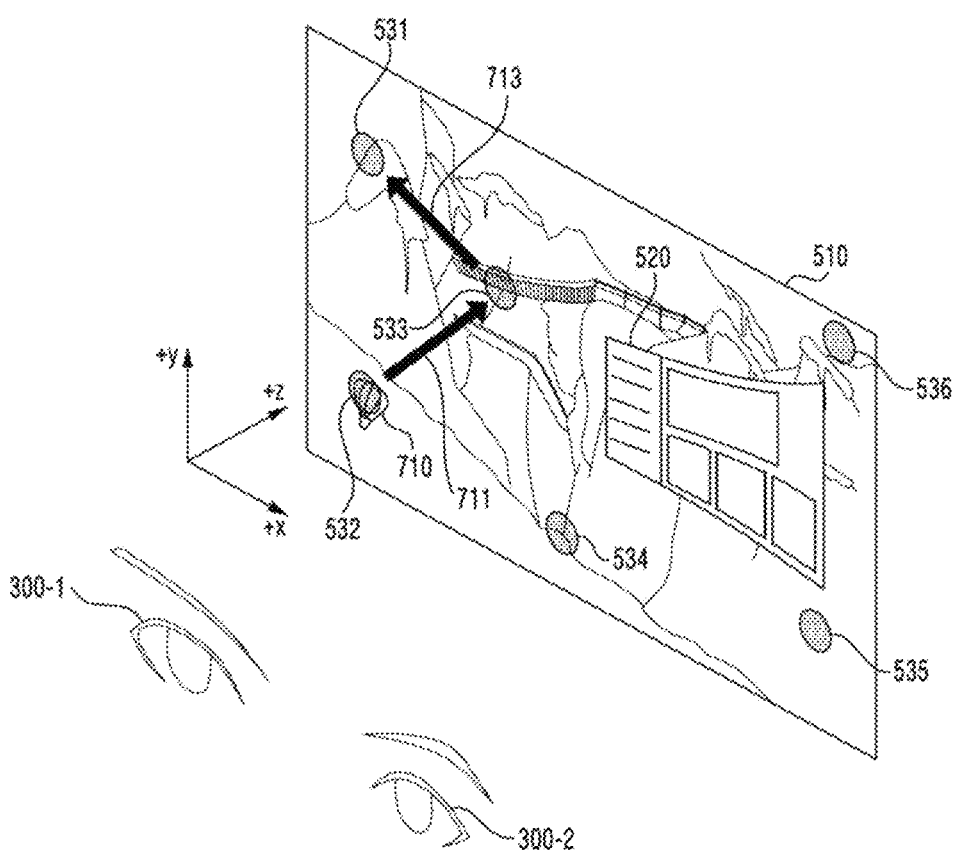
FIG. 7A illustrates an example of a movement path of a visual object for user calibration of a wearable device according to an embodiment.

FIG. 6 illustrates a block diagram of a wearable device according to an embodiment. FIG. 7A illustrates an example of a movement path of a visual object for user calibration of a wearable device according to an embodiment. FIG. 7B illustrates an example of a movement path of a visual object for user calibration of a wearable device according to an embodiment.

Figure 7B:
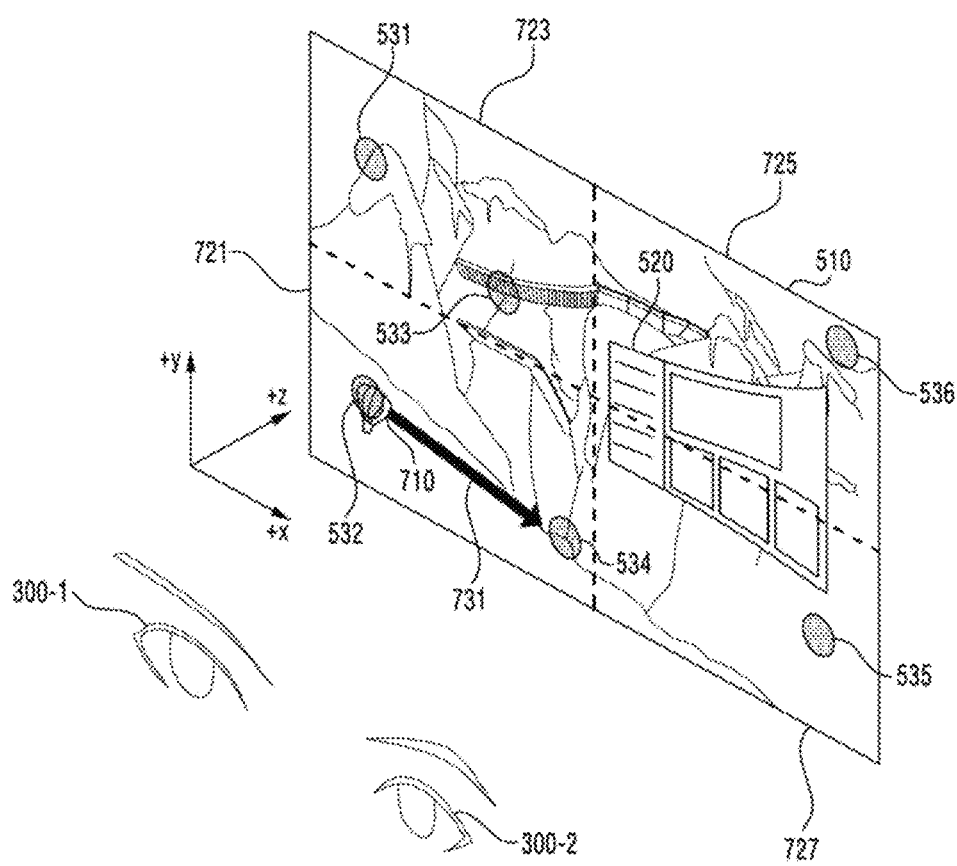
FIG. 7B illustrates an example of a movement path of a visual object for user calibration of a wearable device according to an embodiment.

FIGS. 6, 7A, and 7B may be described with reference to the electronic device 101 of FIG. 1 and/or the wearable device 200 of FIGS. 2A and 2B. FIGS. 6, 7A, and 7B may be described based on the eye model described with reference to FIGS. 3A, 3B, and 3C. FIGS. 6, 7A, and 7B may be described based on an error correction parameter obtained through the user calibration described with reference to FIGS. 4A and 4B.

Operations described with reference to FIG. 6 may be executed by an electronic device 101 and/or a processor 120 of the electronic device 101.

In FIG. 6, the electronic device 101 may include the processor 120, memory 130, a display system 660, a sensor 676, and a camera system 680. In an embodiment, the processor 120 of FIG. 6 may correspond to the processor 120 of FIG. 1. In an embodiment, the memory 130 of FIG. 6 may correspond to the memory 130 of FIG. 1. In an embodiment, the display system 660 of FIG. 6 may correspond to the display module 160 of FIG. 1. In an embodiment, the display system 660 of FIG. 6 may correspond to the displays 250-1 and 250-2 of FIGS. 2A, 2B, and 3A. In an embodiment, the sensor 676 of FIG. 6 may correspond to the sensor module 176 of FIG. 1. In an embodiment, the sensor 676 of FIG. 6 may be an inertial measurement unit (IMU). In an embodiment, the camera system 680 of FIG. 6 may correspond to the camera module 180 of FIG. 1. In an embodiment, the camera system 680 of FIG. 6 may correspond to the cameras 240-1, 240-2, and 240-3, and 240-4 of FIGS. 2A, 2B, and 3A.

In an embodiment, the memory 130 may include a gaze determination unit 611, a gaze accuracy detection unit 613, a background area determination unit 615, a virtual object generation unit 617, and an auto-calibration unit 619.

In an embodiment, the gaze determination unit 611 may identify a gaze through images of two eyes 300-1 and 300-2 of a user 300 obtained through the camera system 680. In an embodiment, the gaze determination unit 611 may obtain feature information (e.g., a position of a glint 367) through the images of the two eyes 300-1 and 300-2 of the user 300 obtained through the camera system 680. In an embodiment, the gaze determination unit 611 may identify a gaze corresponding to the feature information (e.g., the position of the glint 367) based on an eye model. In an embodiment, the gaze determination unit 611 may adjust the identified gaze based on the error correction parameter. Hereinafter, the gaze determination unit 611 identifying the gaze may include identifying the gaze adjusted based on the error correction parameter.

In an embodiment, the gaze determination unit 611 may identify a gaze on a 3D screen displayed through the display system 660. In an embodiment, the gaze determination unit 611 may identify a gaze on the background area 510. In an embodiment, the gaze determination unit 611 may identify a gaze facing visual objects 531, 532, 533, 534, 535, and 536 displayed on the 3D screen. However, the disclosure is not limited to the above embodiments. In an embodiment, the gaze determination unit 611 may identify a gaze on the 3D screen of an application displayed as a full screen in the display system 660. For example, the 3D screen of the application being displayed as the full screen may include that the background area 510 is not included in the 3D screen displayed through the display system 660. For example, the 3D screen of the application being displayed as the full screen may include that only an execution screen of the application is displayed on the 3D screen displayed through the display system 660.

In an embodiment, the gaze determination unit 611 may identify a gaze when an interaction is identified. In an embodiment, the gaze determination unit 611 may identify a gaze when the interaction with respect to one of the visual objects 531, 532, 533, 534, 535, and 536 is identified. For example, the interaction may include a gesture (e.g., hand-pinch) for selecting a visual object. However, the disclosure is not limited to the above embodiment.

In an embodiment, the gaze determination unit 611 may identify a visual object to which the identified gaze faces. In an embodiment, the gaze determination unit 611 may identify an object having a selection area in which the identified gaze is positioned. In an embodiment, the gaze determination unit 611 may identify the visual object to which the identified gaze faces when an interaction (e.g., a gesture for selecting an object) is identified. In an embodiment, the gaze determination unit 611 may identify the object having the selection area in which the identified gaze is positioned when the interaction is identified.

In an embodiment, the gaze accuracy detection unit 613 may identify a gaze error. In an embodiment, the gaze accuracy detection unit 613 may identify the gaze error based on the gaze and the visual object, identified by the gaze determination unit 611. For example, the gaze accuracy detection unit 613 may identify a difference between the gaze (or a focal position of the gaze) and a center position of the visual object as the gaze error. For example, the gaze error may be a three-dimensional error. For example, the gaze error may include an error in an x-axis direction, an error in a y-axis direction, and an error in a z-axis direction.

In an embodiment, the gaze accuracy detection unit 613 may identify a gaze error of a gaze facing a visual object that satisfies a designated condition. For example, the designated condition may be related to a size of a visual object. For example, the gaze accuracy detection unit 613 may identify a gaze error of a gaze facing a visual object less than or equal to a designated size. For example, the designated condition may be related to a display time point of a visual object. For example, the gaze accuracy detection unit 613 may identify a gaze error of a gaze facing a visual object displayed within a designated display time point. However, the disclosure is not limited to the above embodiment.

In an embodiment, the gaze accuracy detection unit 613 may store information on a gaze error. For example, the information on the gaze error may include a position of a visual object, a focal position of a gaze, the gaze error, and/or an interaction time. In an embodiment, the interaction time may be a time taken for an interaction (e.g., the gesture for selecting the visual object) with the visual object. In an embodiment, the interaction time may be a time taken until both the gaze facing the visual object and the interaction for selecting the visual object are identified after the visual object is displayed. In an embodiment, in the case that the gaze is positioned within a selection area of the visual object, the gaze may be evaluated as facing the visual object.

In an embodiment, the gaze accuracy detection unit 613 may store the information on the gaze error for each designated areas of the 3D screen displayed through the display system 660. In an embodiment, the designated areas of the 3D screen may be areas that do not overlap with each other. The information on the gaze errors for each of (or at least one of) the designated areas of the 3D screen may include information (e.g., an average gaze error (or a representative gaze error) and an average interaction time (or a representative interaction time)) on gaze errors identified through visual objects displayed in each of (or at least one of) the designated areas. However, the disclosure is not limited to the above embodiment. In an embodiment, the representative gaze error may indicate a mode value of the gaze errors identified through the visual objects displayed in each of (or at least one of) the designated areas. In an embodiment, the representative interaction time may indicate a mode value of interaction times identified through the visual objects displayed in each of (or at least one of) the designated areas.

In an embodiment, the gaze accuracy detection unit 613 may determine whether eye calibration is required.

For example, the gaze accuracy detection unit 613 may determine whether the eye calibration is required based on the gaze error. For example, the gaze accuracy detection unit 613 may determine that eye calibration is required based on at least one gaze error exceeding a reference gaze error. For example, the gaze accuracy detection unit 613 may determine that the eye calibration is required based on a gaze error (or the average gaze error) (or the representative gaze error) of at least one area of a plurality of areas of the 3D screen exceeding the reference gaze error.

For example, the gaze accuracy detection unit 613 may determine whether the eye calibration is required based on the interaction time. For example, the gaze accuracy detection unit 613 may determine that eye calibration is required based on at least one interaction time exceeding a reference interaction time. For example, the gaze accuracy detection unit 613 may determine that eye calibration is required based on an interaction time (or the average interaction time) (or the representative interaction time) of the at least one area of the plurality of areas of the 3D screen exceeding the reference interaction time.

For example, the gaze accuracy detection unit 613 may determine whether the eye calibration is required based on a slippage (and/or re-wearing). In an embodiment, the gaze accuracy detection unit 613 may identify an occurrence of the slippage (and/or re-wearing) of the electronic device 101, through the sensor 676 and/or the camera system 680. For example, the gaze accuracy detection unit 613 may identify the occurrence of the slippage based on the electronic device 101 being relatively moved from the user 300, through the sensor 676 and/or the camera system 680. For example, through the sensor 676 and/or the camera system 680, the gaze accuracy detection unit 613 may identify that the electronic device 101 is worn again by the user 300 within a predetermined time after being taken off from the user 300. However, the disclosure is not limited to the above embodiment.

For example, the gaze accuracy detection unit 613 may determine that the eye calibration is required based on identifying the slippage (and/or re-wearing).

In an embodiment, the gaze accuracy detection unit 613 may determine whether to perform the eye calibration based on determining that the eye calibration is required.

For example, in the case that only the execution screen of the application is displayed on the 3D screen displayed through the display system 660 (or in the case that the 3D screen of the application is displayed as the full screen), the gaze accuracy detection unit 613 may determine to defer the performance of the eye calibration. For example, in the case that the gaze of the user 300 is on the execution screen of the application displayed through the display system 660 (or in the case that the interaction with respect to the application is identified), the gaze accuracy detection unit 613 may determine to defer the performance of the eye calibration. However, the disclosure is not limited to the above embodiment. For example, even in the case only the execution screen of the application is displayed on the 3D screen displayed through the display system 660 (or in the case that the 3D screen of the application is displayed as the full screen), the gaze accuracy detection unit 613 may determine to perform the eye calibration.

For example, in the case that the background area 510 is at least partially included in the 3D screen displayed through the display system 660, the gaze accuracy detection unit 613 may determine to perform the eye calibration. For example, in the case that the gaze of the user 300 is positioned in an area other than the execution screen of the application displayed through the display system 660, the gaze accuracy detection unit 613 may determine to perform the eye calibration. However, the disclosure is not limited to the above embodiment.

For example, in the case that at least one gaze error exceeds a threshold gaze error, the gaze accuracy detection unit 613 may determine to perform the eye calibration. For example, in the case that the gaze error (or the average gaze error) (or the representative gaze error) of the at least one area of the plurality of areas of the 3D screen exceeds the threshold gaze error, the gaze accuracy detection unit 613 may determine to perform the eye calibration.

For example, in case that at least one interaction time exceeds a threshold interaction time, the gaze accuracy detection unit 613 may determine to perform the eye calibration. For example, in case that the interaction time (or the average interaction time) (or the representative interaction time) of the at least one area of the plurality of areas of the 3D screen exceeds the threshold interaction time, the gaze accuracy detection unit 613 may determine to perform the eye calibration.

For example, the gaze accuracy detection unit 613 may determine to perform the eye calibration based on identifying the slippage (and/or re-wearing).

In an embodiment, the background area determination unit 615 may identify the background area 510. In an embodiment, the background area determination unit 615 may identify the background area 510 based on determining to perform the eye calibration.

In an embodiment, the background area determination unit 615 may identify an area other than the execution screen 520 of the application as the background area 510 on the 3D screen.

In an embodiment, the background area determination unit 615 may identify positions to display a virtual object in the background area 510. In an embodiment, the background area determination unit 615 may identify (or select) the positions to display the virtual object based on the gaze errors. In an embodiment, the background area determination unit 615 may identify (or select) positions having a gaze error greater than or equal to a designated gaze error among positions in which the gaze error is identified. In an embodiment, the background area determination unit 615 may identify (or select) the positions to display the virtual object in a descending order of the gaze errors in the background area 510. However, the disclosure is not limited to the above embodiment. In an embodiment, in the case that only the execution screen of the application is displayed on the 3D screen (or in the case that the 3D screen of the application is displayed as the full screen), the background area determination unit 615 may identify (or select) the positions to display virtual objects in the descending order of the gaze errors on the execution screen (e.g., the execution screen 520) of the application.

According to an embodiment, the background area determination unit 615 may identify areas to display the virtual object. In an embodiment, the background area determination unit 615 may identify (or select) the areas to display the virtual object based on the gaze errors. In an embodiment, the background area determination unit 615 may identify (or select) the areas to display the virtual object, based on the positions having the gaze error greater than or equal to the designated gaze error among the positions in which the gaze error is identified. For example, the areas to display the virtual object may be a portion of the plurality of areas of the 3D screen. For example, the areas to display the virtual object may be a portion of the plurality of areas of the predefined 3D screen. For example, the areas to display the virtual object may be areas in which the gaze error of the plurality of areas of the 3D screen is greater than or equal to the designated gaze error. For example, the gaze error of the plurality of areas may be an average gaze error (or a representative gaze error) of a gaze error of positions included in an area. However, it is not limited thereto. For example, the areas to display the virtual object may be areas of clusters (or clusters of positions within a designated distance from center positions of the clusters) of positions having a gaze error greater than or equal to the gaze error.

In an embodiment, the virtual object generation unit 617 may generate a virtual object. In an embodiment, the virtual object generation unit 617 may generate the virtual object based on determining to perform the eye calibration.

In an embodiment, the virtual object generation unit 617 may generate the virtual object based on the background area 510 (and/or a wallpaper displayed in the background area 510).

In an embodiment, the virtual object generation unit 617 may generate the virtual object based on at least one word indicating the background area 510 (and/or the wallpaper displayed in the background area 510). For example, the at least one word may be obtained through a prompt generator. In an embodiment, the prompt generator may be an artificial intelligence (AI) model (e.g., a stable diffusion model) capable of changing an input image into text. However, the disclosure is not limited to the above embodiment.

In an embodiment, the virtual object generation unit 617 may obtain a prompt for generating the virtual object based on the background area 510 (and/or the wallpaper displayed in the background area 510). In an embodiment, the prompt may include data for guiding generating of the virtual object based on the input image. In an embodiment, the prompt may be a work instruction with respect to a generative AI model. In an embodiment, the prompt may be a set of words (or a sentence including words) for generating an image with respect to the virtual object from the input image through the generative AI model.

In an embodiment, the virtual object generation unit 617 may identify the prompt for generating the virtual object according to a situation described by the input image. For example, the situation described by the input image may be classified according to a manner (e.g., landscape painting, portrait, and still life painting) of depicting an object included in the background area 510 (or the wallpaper of the background area 510), a design pattern of the background area 510 (or the wallpaper of the background area 510), a type (e.g., person, animal, plant, and item) of objects included in the background area 510 (or the wallpaper of the background area 510), a relationship (e.g., friend, and family) between the objects, and/or a time (e.g., morning, AM, afternoon, evening, and dawn) described by the background area 510 (or the wallpaper of the background area 510).

In an embodiment, the virtual object generation unit 617 may obtain the virtual object by inputting a prompt corresponding to the background area 510 (or the wallpaper of the background area 510) into the generative AI model. In an embodiment, the generative AI model may include a plurality of parameters related to a neural network having a structure based on an encoder and a decoder, such as a transformer.

In an embodiment, the virtual object generation unit 617 may identify the prompt for generating the virtual object based on a partial visual object among visual objects included in the background area 510 (or the wallpaper of the background area 510). In an embodiment, the partial visual object may be a visual object having a selection area where the identified gaze is positioned.

According to an embodiment, in the case that only the execution screen of the application is displayed on the 3D screen (or in the case that the 3D screen of the application is displayed as the full screen), the virtual object generation unit 617 may generate the virtual object based on the execution screen (e.g., the execution screen 520) of the application. In an embodiment, in the case that only the execution screen of the application is displayed on the 3D screen (or in the case that the 3D screen of the application is displayed as the full screen), the virtual object generation unit 617 may generate the virtual object based on at least one word indicating the execution screen of the application. For example, the at least one word may be obtained through the prompt generator.

In an embodiment, the auto-calibration unit 619 may display the virtual object generated in the virtual object generation unit 617 at positions identified in the background area determination unit 615.

In an embodiment, the auto-calibration unit 619 may display the virtual object such that the virtual object is moved through the identified positions. For example, the auto-calibration unit 619 may display the virtual object such that the virtual object moves through the identified positions in a descending order of a gaze error of the identified positions. For example, in FIG. 7A, the auto-calibration unit 619 may display a virtual object 710 along paths 711 and 713 connecting partial visual objects 532, 533, and 531, in the descending order of the gaze error of visual objects 521, 532, 533, 534, 535, and 536. However, the disclosure is not limited to the above embodiment. For example, the auto-calibration unit 619 may display the virtual object such that the virtual object moves through a path in which a time (or a path) for moving the identified positions is the shortest. For example, the auto-calibration unit 619 may display the virtual object 710 such that the virtual object 710 is moved through a path that does not cross the execution screen 520 of the application.

In an embodiment, the auto-calibration unit 619 may display the virtual object such that the virtual object is displayed in an identified area (or an area identified in the background area determination unit 615) among the plurality of areas of the 3D screen. For example, the auto-calibration unit 619 may display the virtual object within an area with a high gaze error of the plurality of areas of the 3D screen. For example, in FIG. 7B, the auto-calibration unit 619 may display the virtual object 710 within the area (e.g., an area 721) with the high gaze error among areas 721, 723, 725, and 727. For example, the auto-calibration unit 619 may display the virtual object 710 along a path 731 connecting the visual objects 532 and 534 in the descending order of the gaze error among the visual objects 532, 534 within the area (e.g., the area 721) with the high gaze error.

For example, the auto-calibration unit 619 may display the virtual object in the plurality of areas of the 3D screen, in the descending order of the gaze error. For example, in FIG. 7B, the auto-calibration unit 619 may display the virtual object 710 within the area (e.g., the area 721) with the highest gaze error, and then display the virtual object 710 within an area with the next highest gaze error (e.g., the area 723).

In an embodiment, the auto-calibration unit 619 may identify a gaze error based on a gaze of the user 300 looking at the virtual object 710.

In an embodiment, the auto-calibration unit 619 may identify the gaze error based on the gaze of the user 300 looking at the virtual object 710 and a position where the virtual object 710 is displayed. For example, the auto-calibration unit 619 may identify a difference between the gaze (or a focal position of the gaze) and a center position of the virtual object 710 as the gaze error. For example, the auto-calibration unit 619 may identify the difference between the center position of the virtual object 710 and the gaze (or the focal position of the gaze), moving along the paths 711 and 713 connecting the partial visual objects 532, 533, and 531 as the gaze error. For example, the auto-calibration unit 619 may identify the difference between the gaze (or the focal position of the gaze) and the center position of the virtual object 710, when the virtual object 710 moving along the paths 711 and 713 is positioned at the position of the partial visual objects 532, 533, and 531 as the gaze error.

In an embodiment, the auto-calibration unit 619 may identify the difference between the gaze (or the focal position of the gaze) and the center position of the virtual object 710 as the gaze error, based on a movement of the gaze of the user 300, corresponding to a direction and/or a speed in which the virtual object 710 moves. In an embodiment, the auto-calibration unit 619 may identify the difference between the gaze (or the focal position of the gaze) and the center position of the virtual object 710 as the gaze error while the gaze of the user 300 faces the virtual object 710. The gaze of the user 300 facing the virtual object 710 may mean that the gaze of the user 300 is positioned within a selection area of the virtual object 710. However, the disclosure is not limited to the above embodiment.

In an embodiment, the auto-calibration unit 619 may store information on the gaze error based on the difference between the gaze (or the focal position of the gaze) and the center position of the virtual object 710. For example, the information on the gaze error may include a position of the virtual object 710, the focal position of the gaze, and/or the gaze error. For example, the information on the gaze error may be set for each of (or at least one of) the designated areas of the 3D screen. For example, the information on the gaze error for each of (or at least one of) the designated areas of the 3D screen may include information (e.g., an average gaze error (or a representative gaze error)) on gaze errors identified through virtual objects 710 displayed in each of (or at least one of) the designated areas.

In an embodiment, the auto-calibration unit 619 may identify and store an error correction parameter for reducing the gaze error of each of (or at least one of) positions where the gaze error is identified. In an embodiment, the auto-calibration unit 619 may identify and store the error correction parameter for each of (or at least one of) the designated areas of the 3D screen, based on the gaze error for each of (or at least one of) the designated areas of the 3D screen.

Thereafter, the gaze determination unit 611 may identify a gaze on the 3D screen displayed through the display system 660 by using the error correction parameter obtained based on the virtual object 710.

For example, the gaze determination unit 611 may identify the gaze through images of the two eyes 300-1 and 300-2 of the user obtained through the camera system 680. For example, the gaze determination unit 611 may obtain the feature information (e.g., the position of the glint 367) through the images of the two eyes 300-1 and 300-2 of the user obtained through the camera system 680. For example, the gaze determination unit 611 may identify the gaze corresponding to the feature information (e.g., the position of the glint 367) based on the eye model. For example, the gaze determination unit 611 may adjust the identified gaze based on the error correction parameter. For example, the gaze determination unit 611 may correct (or adjust) a gaze error of the identified gaze based on the error correction parameter. For example, the gaze determination unit 611 may correct (or adjust) the gaze error of the identified gaze by adjusting a value of a determined parameter of the identified gaze by a value for the error correction.

The error correction parameter for adjusting the identified gaze may include an error correction parameter obtained through the eye calibration based on FIG. 4A and the error correction parameter obtained based on the virtual object 710. However, the disclosure is not limited to the above embodiment.

According to an embodiment, the electronic device 101 may determine whether to maintain the obtained error correction parameter based on the virtual object 710. For example, based on the electronic device 101 being taken off from the user 300, the electronic device 101 may determine whether to maintain the error correction parameter obtained based on the virtual object 710.

For example, based on the electronic device 101 being temporarily taken off from the user 300 (or based on the electronic device 101 being re-worn by the user 300), the electronic device 101 may determine to maintain the error correction parameter obtained based on the virtual object 710.

For example, the electronic device 101 may determine to discard (or remove) (or delete) the error correction parameter obtained based on the virtual object 710, based on a state in which the electronic device 101 has been taken off from the user 300 lasting for a reference time or more. Discarding (or removing) (or deleting) the error correction parameter obtained based on the virtual object 710 may indicate that an identification of a gaze of the user 300 is adjusted based on the error correction parameter obtained through the eye calibration based on FIG. 4A when the user 300 wears the electronic device 101 later.

According to an embodiment, the electronic device 101 may merge the error correction parameter obtained based on the virtual object 710 with the error correction parameter obtained through eye calibration based on FIG. 4A. For example, merging the error correction parameter obtained based on the virtual object 710 with the error correction parameter obtained through the eye calibration based on FIG. 4A may include updating the eye calibration based on FIG. 4A, based on the error correction parameter obtained based on the virtual object 710.

For example, in the case that the gaze error identified based on the virtual object 710 is less than or equal to a reference error, the electronic device 101 may merge the error correction parameter obtained based on the virtual object 710 with the error correction parameter obtained through the eye calibration based on FIG. 4A. However, the disclosure is not limited to the above embodiment.

As described above, in the case that the gaze error occurs, the electronic device 101 may obtain the error correction parameter for reducing the gaze error without switching to a screen of the application for the eye calibration. Accordingly, the electronic device 101 may improve a user experience related to the gaze without ceasing the provision of media content being provided to the user 300.

Figure 8:
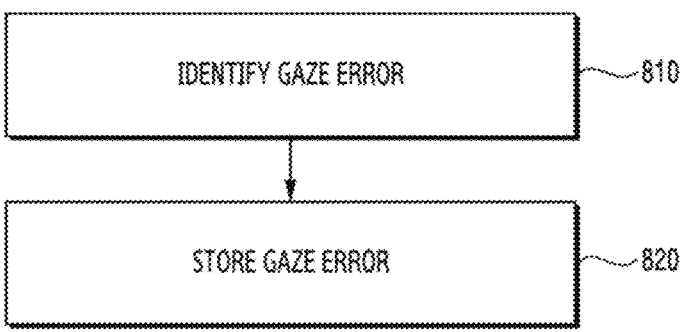
FIG. 8 illustrates operations performed by a wearable device according to an embodiment.

FIG. 8 illustrates operations performed by a wearable device according to an embodiment.

FIG. 8 may be described with reference to the electronic device 101 of FIG. 1, and the wearable device 200 of FIG. 2A and FIG. 2B.

In FIG. 8, in operation 810, an electronic device 101 may identify a gaze error. In an embodiment, the electronic device 101 may identify the gaze error based on a gaze of the user 300 and a visual object. For example, the electronic device 101 may identify a difference between the gaze (or a focal position of the gaze) and a center position of the visual object where the gaze faces as the gaze error. For example, the gaze error may be a three-dimensional error. For example, the gaze error may include an error in an x-axis direction, an error in a y-axis direction, and an error in a z-axis direction.

In operation 820, the electronic device 101 may store the gaze error. In an embodiment, the electronic device 101 may store each of (or at least one of) gaze errors with respect to corresponding designated areas of a 3D screen. In an embodiment, the electronic device 101 may store each of (or at least one of) the gaze errors by mapping to the corresponding areas. In an embodiment, the designated areas of the 3D screen may be areas that do not overlap with each other. In an embodiment, the electronic device 101 may store a gaze error after the eye calibration according to FIG. 4A. In an embodiment, the electronic device 101 may discard (or remove) a gaze error obtained before the eye calibration according to FIG. 4A. In an embodiment, the electronic device 101 may store a gaze error obtained after wearing the current electronic device 101. In an embodiment, the electronic device 101 may discard (or remove) a gaze error obtained before wearing the current electronic device 101.

Figure 9:
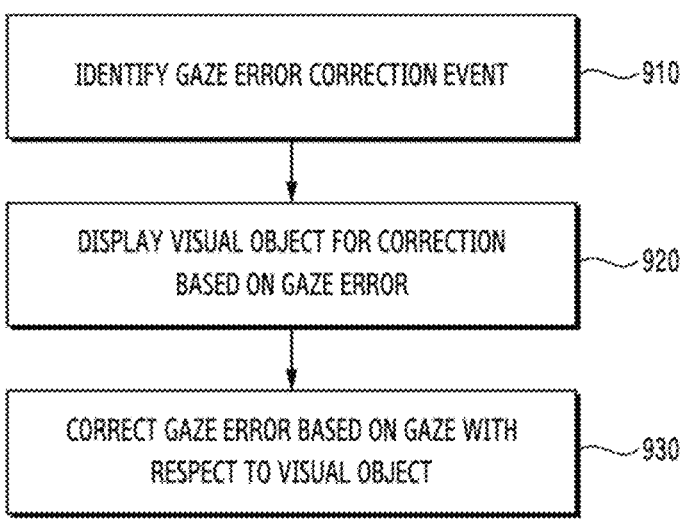
FIG. 9 illustrates operations performed by a wearable device according to an embodiment.

FIG. 9 illustrates operations performed by a wearable device according to an embodiment.

FIG. 9 may be described with reference to the electronic device 101 of FIG. 1 and the wearable device 200 of FIG. 2A and FIG. 2B. Operations of FIG. 9 may be performed after the operations of FIG. 8. However, the disclosure is not limited to the above embodiment.

In FIG. 9, in operation 910, the electronic device 101 may identify an event for correcting a gaze error.

For example, the electronic device 101 may identify the event for correcting the gaze error based on the gaze error. For example, the electronic device 101 may identify the event for correcting the gaze error based on the gaze error exceeding a reference gaze error.

The electronic device 101 may identify the event for correcting the gaze error based on an interaction time. The electronic device 101 may identify the event for correcting the gaze error based on the interaction time exceeding a reference interaction time.

For example, the electronic device 101 may identify the event for correcting the gaze error based on an occurrence of a slippage.

In operation 920, the electronic device 101 may display a visual object for the correction based on the gaze error.

In an embodiment, the electronic device 101 may display a visual object corresponding to a background area 510 (and/or a wallpaper displayed on the background area 510) for the correction based on the gaze error. However, the disclosure is not limited to the above embodiment. In an embodiment, the electronic device 101 may display a visual object corresponding to partial visual objects among visual objects included in the background area 510 (or the wallpaper of the background area 510). In an embodiment, the partial visual objects may be a visual object having a selection area in which an identified gaze is positioned.

In an embodiment, the electronic device 101 may display the visual object on the background area 510 of the 3D screen for the correction based on the gaze error. In an embodiment, the electronic device 101 may display the visual object in positions (or areas) having a gaze error greater than or equal to a designated gaze error in the background area 510 for the correction based on a gaze error.

In operation 930, the electronic device 101 may correct the gaze error based on a gaze with respect to the visual object. In an embodiment, the electronic device 101 may identify the gaze error based on a gaze of the user 300 looking at the visual object and a position where the visual object is displayed. In an embodiment, the electronic device 101 may identify and store an error correction parameter for correcting (or reducing) a gaze error of each of (or at least one of) positions where the gaze error is identified. In an embodiment, the electronic device 101 may correct the gaze of the user 300 based on the error correction parameter.

Figure 10:
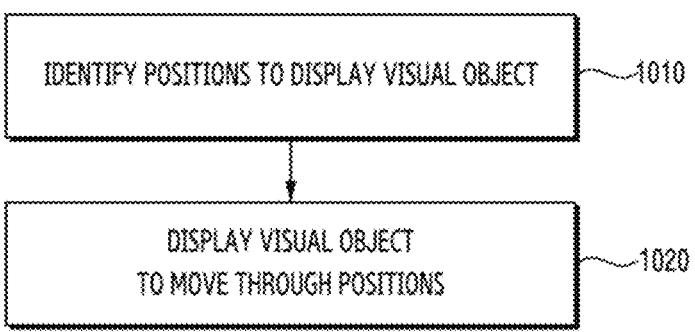
FIG. 10 illustrates operations performed by a wearable device according to an embodiment.

FIG. 10 illustrates operations performed by a wearable device according to an embodiment.

FIG. 10 may be described with reference to the electronic device 101 of FIG. 1, and the wearable device 200 of FIG. 2A and FIG. 2B. Operations of FIG. 10 may be included in the operation 920 of FIG. 9. However, the disclosure is not limited to the above embodiment.

In FIG. 10, in operation 1010, the electronic device 101 may identify positions to display the visual object. According to an embodiment, the electronic device 101 may identify a background area 510 as an area including the positions to display the visual object.

In an embodiment, the electronic device 101 may identify the positions to display the visual object based on gaze errors. In an embodiment, the electronic device 101 may identify positions having a gaze error greater than or equal to a designated gaze error among positions in which the gaze error is identified. In an embodiment, the electronic device

101 may identify (or select) positions to display the visual object in a descending order of the gaze errors in the background area 510.

In operation 1020, the electronic device 101 may display the visual object to move through the positions.

For example, the electronic device 101 may display the visual object such that the visual object moves through the identified positions in the descending order of the gaze error of the identified positions. For example, the electronic device 101 may display the visual object along paths 711 and 713 connecting partial display positions selected in the descending order of the gaze error. However, the disclosure is not limited to the above embodiment. For example, the electronic device 101 may display the visual object such that the visual object moves through a path in which a time (or path) for moving the display positions is the shortest. For example, the electronic device 101 may display the visual object such that the visual object is moved through a path that does not cross an execution screen 520 of an application.

In an embodiment, the electronic device 101 may display the virtual object such that the virtual object is moved within an identified area (or an area identified by a background area determination unit 615) among a plurality of areas of a 3D screen. For example, the electronic device 101 may display the virtual object such that the virtual object moves through positions identified within an area (e.g., an area 721) with a high gaze error among areas 721, 723, 725, and 727, in the descending order of the gaze error.

Figure 11:
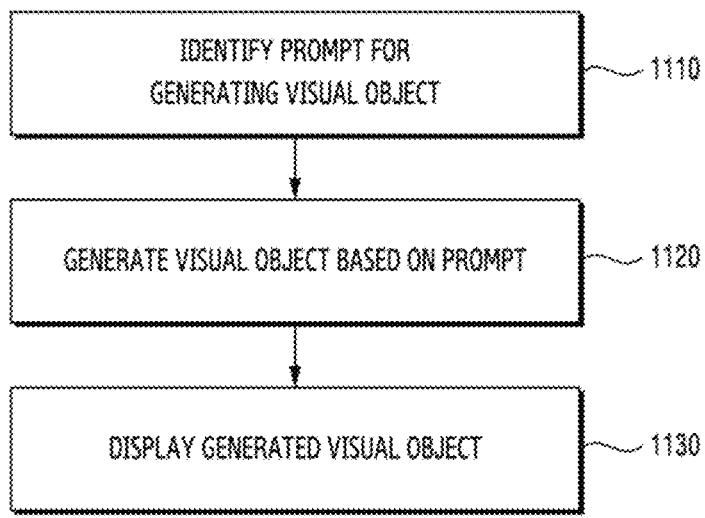
FIG. 11 illustrates operations performed by a wearable device according to an embodiment.

FIG. 11 illustrates operations performed by a wearable device according to an embodiment.

FIG. 11 may be described with reference to the electronic device 101 of FIG. 1, and the wearable device 200 of FIG. 2A and FIG. 2B. Operations of FIG. 11 may be included in the operation 920 of FIG. 9. However, the disclosure is not limited to the above embodiment.

In FIG. 11, in operation 1110, an electronic device 101 may identify a prompt for generating a visual object.

In an embodiment, the electronic device 101 may obtain the prompt for generating the visual object based on a background area 510 (and/or a wallpaper displayed in the background area 510).

In an embodiment, the electronic device 101 may identify the prompt for generating the visual object according to a situation described by an input image. For example, the situation described by the input image may be classified according to a manner (e.g., landscape painting, portrait, and still life painting) of depicting an object included in the background area 510 (or the wallpaper of the background area 510), a design pattern of the background area 510 (or the wallpaper of the background area 510), a type (e.g., person, animal, plant, and item) of objects included in the background area 510 (or the wallpaper of the background area 510), a relationship (e.g., friend, and family) between the objects, and/or a time (e.g., morning, AM, afternoon, evening, and dawn) described by the background area 510 (or the wallpaper of the background area 510).

In an embodiment, the electronic device 101 may identify the prompt for generating the visual object based on a partial visual object among visual objects included in the background area 510 (or the wallpaper of the background area 510). In an embodiment, the partial visual object may be a visual object having a selection area where an identified gaze is positioned.

In operation 1120, the electronic device 101 may generate the visual object based on the prompt.

In an embodiment, the electronic device 101 may obtain the virtual object by inputting the prompt to a generative AI model. In an embodiment, the electronic device 101 may obtain the virtual object by inputting a prompt corresponding to the background area 510 (or the wallpaper of the background area 510) into the generative AI model. In an embodiment, the electronic device 101 may obtain the virtual object by inputting a prompt corresponding to the visual object having the selection area in which the identified gaze is positioned into the generative AI model.

In operation 1130, the electronic device 101 may display the generated visual object.

In an embodiment, the electronic device 101 may display the visual object generated in the background area 510 of the 3D screen for correction based on the gaze error. In an embodiment, the electronic device 101 may display the visual object generated in positions (or areas) having a gaze error greater than or equal to a designated gaze error in the background area 510 for the correction based on the gaze error. However, the disclosure is not limited to the above embodiment.

Figure 12:
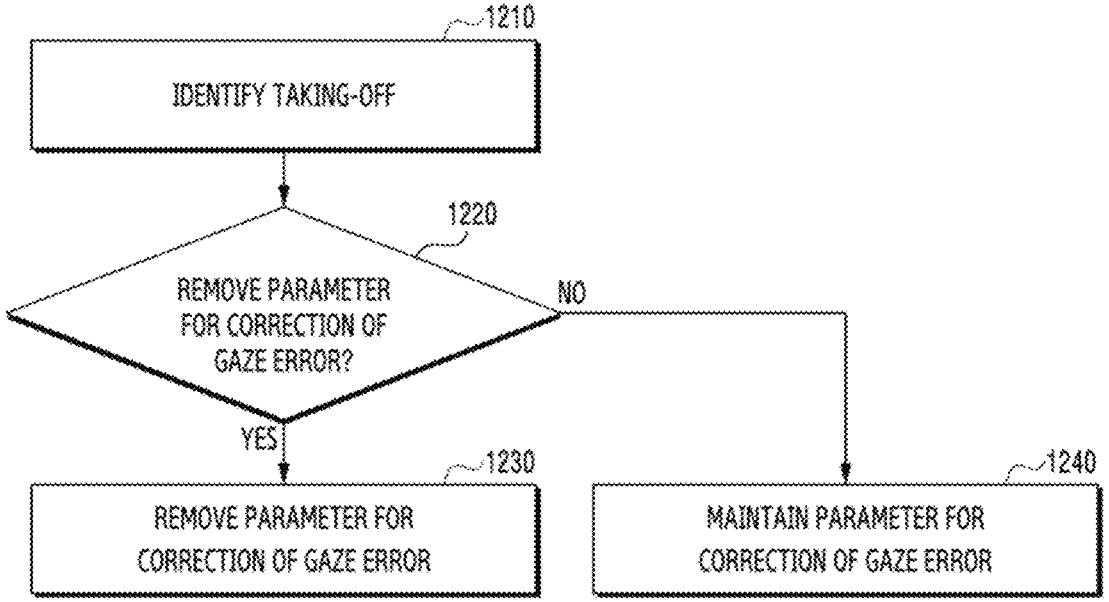
FIG. 12 illustrates operations performed by a wearable device according to an embodiment.

FIG. 12 illustrates operations performed by a wearable device according to an embodiment.

FIG. 12 may be described with reference to the electronic device 101 of FIG. 1, and the wearable device 200 of FIG. 2A and FIG. 2B. Operations of FIG. 12 may be performed after the operation 930 of FIG. 9. However, the disclosure is not limited to the above embodiment.

In FIG. 12, in operation 1210, an electronic device 101 may identify taking-off.

In operation 1220, the electronic device 101 may determine whether removal of a parameter for correction of a gaze error is necessary.

For example, the electronic device 101 may determine whether the removal of the parameter for the correction of the gaze error is necessary, based on a state in which the electronic device 101 is taken off from the user 300. For example, the electronic device 101 may determine that the removal of the parameter for the correction of the gaze error is necessary, based on the state in which the electronic device 101 is taken off from the user 300 is maintained for a reference time or more. For example, the electronic device 101 may determine that the removal of the parameter for the correction of the gaze error is not necessary, based on the state in which the electronic device 101 is taken off from the user 300 is maintained for less than the reference time (or the electronic device 101 being temporarily taken off from the user 300) (or the electronic device 101 being re-worn by the user 300).

For example, the electronic device 101 may determine whether the removal of the parameter for the correction of the gaze error is necessary, based on the gaze error used to obtain the parameter for the correction of the gaze error being less than or equal to a reference gaze error. For example, the electronic device 101 may determine that the removal of the parameter for the correction of the gaze error is necessary, based on the gaze error used to obtain the parameter for the correction of the gaze error exceeding the reference gaze error. For example, the electronic device 101 may determine that the removal of the parameter for the correction of the gaze error is not necessary, based on the gaze error used to obtain the parameter for the correction of the gaze error being less than or equal to the reference gaze error.

In operation 1220, based on determining that the removal of the parameter for the correction of the gaze error is necessary, the electronic device 101 may perform operation

1230. In the operation 1220, based on determining that the removal of the parameter for the correction of the gaze error is not necessary, the electronic device 101 may perform operation 1240.

In operation 1230, the electronic device 101 may remove the parameter for the correction of the gaze error. Removing the parameter for the correction of the gaze error may indicate that when the user 300 wears the electronic device 101 later, the identification of the gaze of the user 300 is adjusted based on the error correction parameter obtained through the eye calibration based on FIG. 4A.

In operation 1240, the electronic device 101 may maintain the parameter for the correction of the gaze error. The parameter for the correction of the gaze error being maintained may indicate that when the user 300 wears the electronic device 101 later, the identification of the gaze of the user 300 is adjusted based on the error correction parameter obtained through the eye calibration based on FIG. 4A and the parameter for the correction of the gaze error.

The technical problems to be achieved in the present disclosure are not limited to those described above, and other technical problems not mentioned herein will be clearly understood by those having ordinary knowledge in the art to which the present disclosure belongs.

As described above, an wearable device 101 or 200 may include a display system 660 including a first display 250-1 and a second display 250-2 arranged to face eyes 300-1 and 300-2 of a user wearing the wearable device, a camera system 680 including a plurality of cameras 240-1 and 240-2 arranged to obtain an image including the eyes 300-1 and 300-2 of the user wearing the wearable device, at least one processor 120 comprising processing circuitry, and memory 130 comprising one or more storage mediums, storing instructions. The instructions, when executed by the at least one processor 120 individually or collectively, may cause the wearable device 101 or 200 to display objects 531, 532, 533, 534, 535, and 536 at least at different time points on a three dimensional (3D) screen displayed through the display system 660. The instructions, when executed by the at least one processor 120 individually or collectively, may cause the wearable device 101 or 200 to, based on gazes of the eyes 300-1 and 300-2 identified based on the image, identify errors associated with the gazes looking at the objects 531, 532, 533, 534, 535, and 536. The errors may indicate differences between display positions of the objects 531, 532, 533, 534, 535, and 536 and focal positions of the gazes of the eyes 300-1 and 300-2, which have a one-to-one correspondence with the objects 531, 532, 533, 534, 535, and 536. The instructions, when executed by the at least one processor 120 individually or collectively, may cause the wearable device 101 or 200 to display a visual object on a background screen 510 on the display system 660 such that the visual object moves through partial display positions of the display positions selected based on the errors. The instructions, when executed by the at least one processor 120 individually or collectively, may cause the wearable device 101 or 200 to, based on another gaze of the eyes 300-1 and 300-2 looking at the visual object, correct the errors.

The instructions, when executed by the at least one processor 120 individually or collectively, may cause the wearable device 101 or 200 to select the partial display positions, in a descending order of the errors identified in the display positions.

The instructions, when executed by the at least one processor 120 individually or collectively, may cause the wearable device 101 or 200 to display the visual object such that the visual object moves through the partial display positions, in a descending order of the errors of the partial display positions.

The instructions, when executed by the at least one processor 120 individually or collectively, may cause the wearable device 101 or 200 to identify at least one word associated with the background screen 510. The instructions, when executed by the at least one processor 120 individually or collectively, may cause the wearable device 101 or 200 to generate the visual object by inputting the at least one word as a prompt into a generative artificial intelligence (AI) model. The instructions, when executed by the at least one processor 120 individually or collectively, may cause the wearable device 101 or 200 to display the generated visual object on the background screen 510.

The instructions, when executed by the at least one processor 120 individually or collectively, may cause the wearable device 101 or 200 to identify an object on which the gaze of the user is located among the objects 531, 532, 533, 534, 535, and 536 displayed on the background screen 510. The instructions, when executed by the at least one processor 120 individually or collectively, may cause the wearable device 101 or 200 to display the visual object having the same shape as a shape of the object on the background screen 510.

The instructions, when executed by the at least one processor 120 individually or collectively, may cause the wearable device 101 or 200 to, after a first object among the objects 531, 532, 533, 534, 535, and 536 is displayed, identify a time taken for a first gaze of the eyes 300-1 and 300-2 to be located within an interaction area of the first object. The instructions, when executed by the at least one processor 120 individually or collectively, may cause the wearable device 101 or 200 to, based on the time exceeding a reference time, display the visual object on the background screen 510. The instructions, when executed by the at least one processor 120 individually or collectively, may cause the wearable device 101 or 200 to, based on the other gaze of the eyes 300-1 and 300-2 looking at the visual object, correct the errors.

The wearable device 101 or 200 may include an inertial sensor. The instructions, when executed by the at least one processor 120 individually or collectively, may cause the wearable device 101 or 200 to, identify, using the inertial sensor, whether slippage of the wearable device 101 or 200 occurs. The instructions, when executed by the at least one processor 120 individually or collectively, may cause the wearable device 101 or 200 to, based on identifying that the slippage has occurred, display the visual object on the background screen 510. The instructions, when executed by the at least one processor 120 individually or collectively, may cause the wearable device 101 or 200 to, based on the other gaze of the eyes 300-1 and 300-2 looking at the visual object, correct the errors.

The instructions, when executed by the at least one processor 120 individually or collectively, may cause the wearable device 101 or 200 to identify that the wearable device 101 or 200 is worn. The instructions, when executed by the at least one processor 120 individually or collectively, may cause the wearable device 101 or 200 to, based on identifying that the wearable device 101 or 200 is worn, display a calibration screen for gaze calibration on the display system 660. The instructions, when executed by the at least one processor 120 individually or collectively, may cause the wearable device 101 or 200 to determine parameters for identifying the gaze of the eyes 300-1 and 300-2 based on positions of the eyes 300-1 and 300-2 identified through the image while objects 531, 532, 533, 534, 535, and 536 are displayed at different time points on the calibration screen. The errors may be corrected by adjusting a value of the determined parameter by a value for error correction.

The instructions, when executed by the at least one processor 120 individually or collectively, may cause the wearable device 101 or 200 to identify that the wearable device 101 or 200 is taken off. The instructions, when executed by the at least one processor 120 individually or collectively, may cause the wearable device 101 or 200 to remove the value for the error correction based on identifying that the wearable device 101 or 200 is taken off.

The instructions, when executed by the at least one processor 120 individually or collectively, may cause the wearable device 101 or 200 to display the visual object based on the 3D screen displayed through the display system 660 including the background screen 510. The instructions, when executed by the at least one processor 120 individually or collectively, may cause the wearable device 101 or 200 to postpone displaying the visual object based on that the 3D screen displayed through the display system 660 includes only a screen of an application other than the background screen 510.

The partial display positions may be located on the background screen 510 excluding a screen area of the application among the 3D screens displayed through the display system 660.

The instructions, when executed by the at least one processor 120 individually or collectively, may cause the wearable device 101 or 200 to display the visual object on the background screen 510 on the display system 660 such that the visual object moves through a path that does not cross the screen area of the application among the 3D screens displayed through the display system 660.

The method may be executed by a wearable device 101 or 200 comprising a display system 660 including a first display 250-1 and a second display 250-2 arranged to face eyes 300-1 and 300-2 of a user wearing the wearable device, and a camera system 680 including a plurality of cameras 240-1 and 240-2 arranged to obtain an image including the eyes 300-1 and 300-2 of the user wearing the wearable device. The method may include displaying objects 531, 532, 533, 534, 535, and 536 at least at different time points on a three dimensional (3D) screen displayed through the display system 660. The method may include, based on gazes of the eyes 300-1 and 300-2 identified based on the image, identifying errors associated with the gazes looking at the objects 531, 532, 533, 534, 535, and 536. The errors may indicate differences between display positions of the objects 531, 532, 533, 534, 535, and 536 and focal positions of the gazes of the eyes 300-1 and 300-2, which have a one-to-one correspondence with the objects 531, 532, 533, 534, 535, and 536. The method may include displaying a visual object on a background screen 510 on the display system 660 such that the visual object moves through partial display positions of the display positions selected based on the errors. The method may include, based on another gaze of the eyes 300-1 and 300-2 looking at the visual object, correcting the errors.

The method may include selecting the partial display positions, in a descending order of the errors identified in the display positions.

The method may include identifying at least one word associated with the background screen 510. The method may include generating the visual object by inputting the at least one word as a prompt into a generative artificial intelligence (AI) model. The method may include displaying the generated visual object on the background screen 510.

The method may include identifying an object on which the gaze of the user is located among the objects 531, 532, 533, 534, 535, and 536 displayed on the background screen 510. The method may include displaying the visual object having the same shape as a shape of the object on the background screen 510.

The method may include, after a first object among the objects 531, 532, 533, 534, 535, and 536 is displayed, identifying a time taken for a first gaze of the eyes 300-1 and 300-2 to be located within an interaction area of the first object. The method may include, based on the time exceeding a reference time, displaying the visual object on the background screen 510. The method may include, based on the other gaze of the eyes 300-1 and 300-2 looking at the visual object, correcting the errors.

The method may include, identifying, based on an inertial sensor, whether slippage of the wearable device 101 or 200 occurs. The method may include, based on identifying that the slippage has occurred, displaying the visual object on the background screen 510. The method may include, based on the other gaze of the eyes 300-1 and 300-2 looking at the visual object, correcting the errors.

The method may include identifying that the wearable device 101 or 200 is worn. The method may include, based on identifying that the wearable device 101 or 200 is worn, displaying a calibration screen for gaze calibration on the display system 660. The method may include determining parameters for identifying the gaze of the eyes 300-1 and 300-2 based on positions of the eyes 300-1 and 300-2 identified through the image while objects 531, 532, 533, 534, 535, and 536 are displayed at different time points on the calibration screen. Correcting the errors may include adjusting a value of the determined parameter by a value for error correction.

The method may include displaying the visual object based on the 3D screen displayed through the display system 660 including the background screen 510. The method may include postponing displaying the visual object based on that the 3D screen displayed through the display system 660 includes only a screen of an application other than the background screen 510.

As described above, a non-transitory computer-readable recording medium may store a program including instructions. The instructions, when executed by at least one processor 120 of an wearable device 101 or 200 including a display system 660 including a first display 250-1 and a second display 250-2 arranged to face eyes 300-1 and 300-2 of a user wearing the wearable device, and a camera system 680 including a plurality of cameras 240-1 and 240-2 arranged to obtain an image including the eyes 300-1 and 300-2 of the user wearing the wearable device individually or collectively, may cause the electronic device 101 or 200 to display objects 531, 532, 533, 534, 535, and 536 at least at different time points on a three dimensional (3D) screen displayed through the display system 660. The instructions, when executed by the at least one processor 120 individually or collectively, may cause the wearable device 101 or 200 to, based on gazes of the eyes 300-1 and 300-2 identified based on the image, identify errors associated with the gazes looking at the objects 531, 532, 533, 534, 535, and 536. The errors may indicate differences between display positions of the objects 531, 532, 533, 534, 535, and 536 and focal positions of the gazes of the eyes 300-1 and 300-2, which have a one-to-one correspondence with the objects 531, 532, 533, 534, 535, and 536. The instructions, when executed by the at least one processor 120 individually or collectively, may cause the wearable device 101 or 200 to display a visual object on a background screen 510 on the display system 660 such that the visual object moves through partial display positions of the display positions selected based on the errors. The instructions, when executed by the at least one processor 120 individually or collectively, may cause the wearable device 101 or 200 to, based on another gaze of the eyes 300-1 and 300-2 looking at the visual object, correct the errors.

The effects that may be obtained from the present disclosure are not limited to those described above, and any other effects not mentioned herein will be clearly understood by those having ordinary knowledge in the art to which the present disclosure belongs.

The electronic device according to one or more embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

One or more embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. A singular form of a noun corresponding to an item may include one or more of the things unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," or "connected with" another element (e.g., a second element), it means that the element may be coupled with the other element directly (e.g., wiredly), wirelessly, or via a third element.

As used in connection with one or more embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

One or more embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between a case in which data is semi-permanently stored in the storage medium and a case in which the data is temporarily stored in the storage medium.

According to an embodiment, a method according to one or more embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one or more embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. In some embodiments, a plurality of components (e.g., modules or programs) may be integrated into a single component. In such a case, according to one or more embodiments, the integrated component may still perform one or more functions of each of the plurality of components in the same or similar manner as they are performed by a corresponding one of the plurality of components before the integration. According to one or more embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A wearable device comprising:
a display system comprising a first display and a second display, the first display and the second display facing eyes of a user wearing the wearable device,
a plurality of cameras arranged to obtain an image comprising the eyes of the user wearing the wearable device,
at least one processor comprising processing circuitry; and
memory comprising one or more storage mediums and storing instructions,
wherein the instructions, when executed by the at least one processor individually or collectively, cause the wearable device to:
display objects at least at different time points on a three dimensional (3D) screen displayed through the display system, identify, based on the image, gazes looking at the objects,
identify, based on the identified gazes, errors associated with the gazes, wherein the errors indicate differences between display positions of the objects and focal positions of the gazes, and the focal positions have one-to-one correspondences with the objects,
display a visual object on a background screen on the display system to move through partial display positions of the display positions, which are selected based on the errors, and
based on another gaze looking at the visual object, correct the errors.

2. The wearable device of claim 1, wherein the instructions, when executed by the at least one processor individually or collectively, cause the wearable device to select the partial display positions, in a descending order of the errors identified in the display positions.

3. The wearable device of claim 2, wherein the instructions, when executed by the at least one processor individually or collectively, cause the wearable device to display the visual object to move through the partial display positions, in the descending order of the errors of the partial display positions.

4. The wearable device of claim 1, wherein the instructions, when executed by the at least one processor individually or collectively, cause the wearable device to:
identify at least one word associated with the background screen,
generate the visual object by inputting the at least one word as a prompt into a generative artificial intelligence model, and
display the generated visual object on the background screen.

5. The wearable device of claim 1, wherein the instructions, when executed by the at least one processor individually or collectively, cause the wearable device to:
identify an object on which a gaze of the user is located among the objects displayed on the background screen, and
display the visual object having the same shape as a shape of the object on the background screen.

6. The wearable device of claim 1, wherein the instructions, when executed by the at least one processor individually or collectively, cause the wearable device to:
after a first object among the objects is displayed, identify a time taken for a first gaze to be located within an interaction area of the first object, and
based on the time exceeding a reference time:
display the visual object on the background screen, and
based on the another gaze looking at the visual object, correct the errors.

7. The wearable device of claim 1, comprising an inertial sensor,
wherein the instructions, when executed by the at least one processor individually or collectively, cause the wearable device to:
identify, using the inertial sensor, whether slippage of the wearable device occurs, and
based on identifying that the slippage has occurred:
display the visual object on the background screen, and
based on the another gaze looking at the visual object, correct the errors.

8. The wearable device of claim 1, wherein the instructions, when executed by the at least one processor individually or collectively, cause the wearable device to:

identify that the wearable device is worn, based on identifying that the wearable device is worn, display a calibration screen for gaze calibration on the display system, and determine parameters for identifying the gaze based on positions of the eyes identified through the image while objects are displayed at different time points on the calibration screen, and wherein the errors are corrected by adjusting a value of the determined parameters by a value for error correction.

9. The wearable device of claim 8, wherein the instructions, when executed by the at least one processor individually or collectively, cause the wearable device to:

identify that the wearable device is taken off, and based on identifying that the wearable device is taken off, remove the value for the error correction.

10. The wearable device of claim 1, wherein the instructions, when executed by the at least one processor individually or collectively, cause the wearable device to:

based on the 3D screen displayed through the display system comprising the background screen, display the visual object, and based on that the 3D screen displayed through the display system comprising only a screen of an application other than the background screen, postpone displaying the visual object.

11. The wearable device of claim 10, wherein the partial display positions are located on the background screen excluding a screen area of the application among the 3D screens displayed through the display system.

12. The wearable device of claim 11, wherein the instructions, when executed by the at least one processor individually or collectively, cause the wearable device to display the visual object on the background screen on the display system to move the visual object through a path that does not cross the screen area of the application among the 3D screens displayed through the display system.

13. A method executed by a wearable device comprising a display system including a first display and a second display facing eyes of a user wearing the wearable device, and a plurality of cameras arranged to obtain an image including the eyes of the user, the method comprising:

displaying objects at least at different time points on a three dimensional (3D) screen displayed through the display system, identifying, based on the image, gazes looking at the objects, identifying, based on the identified gazes, errors associated with the gazes, wherein the errors indicate differences between display positions of the objects and focal positions of the gazes, and the focal positions have a one-to-one correspondence with the objects, displaying a visual object on a background screen on the display system to move the visual object through partial display positions of the display positions, which are selected based on the errors, and based on another gaze looking at the visual object, correcting the errors.

14. The method of claim 13, comprising selecting the partial display positions, in a descending order of the errors identified in the display positions.

15. The method of claim 13, comprising:

identifying at least one word associated with the background screen, generating the visual object by inputting the at least one word as a prompt into a generative artificial intelligence model, and displaying the generated visual object on the background screen.

16. The method of claim 13, comprising:

identifying an object on which the gaze of the user is located among the objects displayed on the background screen, and displaying the visual object having the same shape as a shape of the object on the background screen.

17. The method of claim 13, comprising:

after a first object among the objects is displayed, identifying a time taken for a first gaze to be located within an interaction area of the first object, and based on the time exceeding a reference time:

displaying the visual object on the background screen, and based on the another gaze looking at the visual object, correcting the errors.

18. The method of claim 13, comprising:

identifying, using an inertial sensor of the wearable device, whether slippage of the wearable device occurs, and based on identifying that the slippage has occurred:

displaying the visual object on the background screen, and based on the another gaze looking at the visual object, correcting the errors.

19. The method of claim 13, comprising:

identifying that the wearable device is worn, based on identifying that the wearable device is worn, displaying a calibration screen for gaze calibration on the display system, and determining parameters for identifying the gazes based on positions of the eyes identified through the image while objects are displayed at different time points on the calibration screen, wherein the correcting the errors comprises adjusting a value of the determined parameters by a value for error correction.

20. The method of claim 13, comprising:

based on the 3D screen displayed through the display system comprising the background screen, displaying the visual object, and based on that the 3D screen displayed through the display system comprises only a screen of an application other than the background screen, postponing displaying the visual object.

* * * * *